US012650318B2

(12) United States Patent
van der Laan

(10) Patent No.: US 12,650,318 B2
(45) Date of Patent: Jun. 9, 2026

(54) METHODS OF GENERATING AND TRANSMITTING POSITIONAL DATA

(71) Applicant: TomTom Traffic B.V., Amsterdam (NL)

(72) Inventor: Antoine Carl van der Laan, Lelystad (NL)

(73) Assignee: TOMTOM TRAFFIC B.V., Amsterdam (NL)

( * ) Notice: Subject to any disclaimer, the term of this patent is extended or adjusted under 35 U.S.C. 154(b) by 192 days.

(21) Appl. No.: 17/785,033

(22) PCT Filed: Dec. 18, 2020

(86) PCT No.: PCT/EP2020/087080
§ 371 (c)(1),
(2) Date: Jun. 13, 2022

(87) PCT Pub. No.: WO2021/123208
PCT Pub. Date: Jun. 24, 2021

(65) Prior Publication Data
US 2023/0021637 A1 Jan. 26, 2023

(30) Foreign Application Priority Data

Dec. 20, 2019 (GB) ...................................... 1918932

(51) Int. Cl.
*G01C 21/00* (2006.01)
(52) U.S. Cl.
CPC ...... *G01C 21/3874* (2020.08); *G01C 21/3811* (2020.08); *G01C 21/3841* (2020.08); *G01C 21/3885* (2020.08)
(58) Field of Classification Search
CPC ............ G01C 21/3874; G01C 21/3811; G01C 21/3841; G01C 21/3885; G01C 21/32; G01C 21/3833; G01C 21/3859
See application file for complete search history.

(56) References Cited

U.S. PATENT DOCUMENTS

| | | | |
|---|---|---|---|
| 9,121,718 B2 * | 9/2015 | Uyeki | ................ G01C 21/3469 |
| 2009/0153362 A1 * | 6/2009 | Goto | .................... G09B 29/006 |
| | | | 340/932.2 |

(Continued)

FOREIGN PATENT DOCUMENTS

| | | |
|---|---|---|
| CN | 102037323 A | 4/2011 |
| CN | 103443817 A | 12/2013 |

(Continued)

OTHER PUBLICATIONS

International Search Report dated Apr. 12, 2021 for International patent application No. PCT/EP2020/087080.

(Continued)

*Primary Examiner* — Kenny Nguyen
(74) *Attorney, Agent, or Firm* — Buckley, Maschoff & Talwalkar LLC

(57) ABSTRACT

A method is provided in which a device associated with a vehicle generates and transmits probe data samples comprising positional data. The method comprises obtaining detected event sequence data indicative of a sequence of detected events relating to the vehicle, obtaining search pattern data indicative of a search pattern of events and using the search pattern data and at least a portion of the detected event sequence data to determine whether a pattern of detected events matching the obtained search pattern of events is present in the at least a portion of the sequence of detected events. When a pattern of detected events matching the obtained search pattern of events is found in the at least a portion of the sequence of detected events, the device generates a probe data sample comprising data indicative of one or both of the search pattern and the matched pattern of events, and data indicative of a position of the device associated with the matched pattern of events. The device transmits the generated probe data sample.

21 Claims, 9 Drawing Sheets

(56) References Cited

U.S. PATENT DOCUMENTS

| | | | | |
|---|---|---|---|---|
| 2011/0060495 | A1* | 3/2011 | Kono | G01C 21/3469 |
| | | | | 701/31.4 |
| 2013/0021169 | A1 | 1/2013 | Soomro et al. | |
| 2013/0211699 | A1* | 8/2013 | Scharmann | G08G 1/146 |
| | | | | 701/117 |
| 2016/0364985 | A1 | 12/2016 | Penna et al. | |
| 2017/0276504 | A1* | 9/2017 | Lu | G08G 1/096816 |
| 2018/0022533 | A1 | 1/2018 | Nabeiro | |
| 2018/0123935 | A1* | 5/2018 | Ezer | H04L 41/046 |
| 2018/0225339 | A1* | 8/2018 | Bhave | G06F 16/90335 |
| 2019/0022866 | A1 | 1/2019 | Kawase et al. | |
| 2019/0260687 | A1* | 8/2019 | Tauchi | H04L 67/12 |
| 2019/0362387 | A1* | 11/2019 | Jin | G06Q 30/0267 |
| 2020/0026290 | A1* | 1/2020 | Lim | G05D 1/0022 |
| 2020/0117189 | A1* | 4/2020 | Kawai | B60W 60/0011 |
| 2020/0135022 | A1* | 4/2020 | Xu | G08G 1/0141 |
| 2020/0269864 | A1* | 8/2020 | Zhang | G05D 1/0231 |
| 2020/0327804 | A1* | 10/2020 | Xu | G08G 1/095 |
| 2021/0099307 | A1* | 4/2021 | Rolf | H04L 9/0643 |

FOREIGN PATENT DOCUMENTS

| | | | |
|---|---|---|---|
| CN | 105339935 | A | 2/2016 |
| CN | 107710302 | A | 2/2018 |
| CN | 109983306 | A | 7/2019 |
| CN | 110036260 | A | 7/2019 |
| DE | 102014207084 | A1 | 10/2015 |
| JP | 2003203243 | A | 7/2003 |
| JP | 2011252957 | A | 12/2011 |
| JP | 2012505449 | A | 3/2012 |
| WO | 2010081546 | A1 | 7/2010 |
| WO | 2016199496 | A1 | 12/2016 |
| WO | 2018060468 | A2 | 4/2018 |

OTHER PUBLICATIONS

Search Report dated Sep. 17, 2020 for GB application No. 1918932.3.

* cited by examiner

286 — APPLICATION SOFTWARE

284 — OPERATING SYSTEM

282 — BIOS

280 — HARDWARE

288

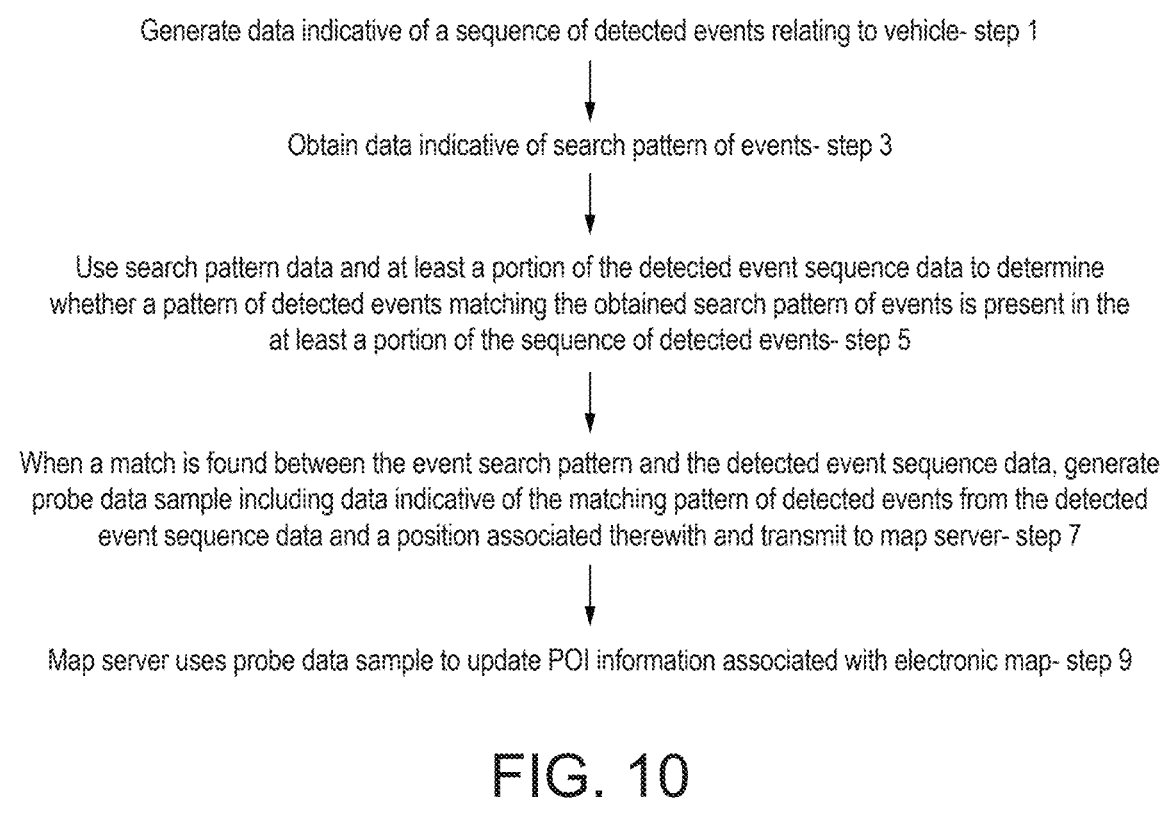

Generate data indicative of a sequence of detected events relating to vehicle- step 1

↓

Obtain data indicative of search pattern of events- step 3

↓

Use search pattern data and at least a portion of the detected event sequence data to determine whether a pattern of detected events matching the obtained search pattern of events is present in the at least a portion of the sequence of detected events- step 5

↓

When a match is found between the event search pattern and the detected event sequence data, generate probe data sample including data indicative of the matching pattern of detected events from the detected event sequence data and a position associated therewith and transmit to map server- step 7

↓

Map server uses probe data sample to update POI information associated with electronic map- step 9

FIG. 10

METHODS OF GENERATING AND TRANSMITTING POSITIONAL DATA

FIELD OF THE INVENTION

The invention relates to methods in which a device associated with a vehicle generates one or more probe data samples comprising data indicative of a position of the vehicle. The invention extends to a device configured to generate one or more probe data samples in accordance with such a method, and to methods of using the generated probe data samples to update electronic map data. As used herein, the term a "probe data sample" refers to a sample comprising at least positional data, and "probe data" refers to a set of one or more, typically a plurality, of such probe data samples.

BACKGROUND OF THE INVENTION

Map data for use by navigation applications is specially designed to be used by route guidance algorithms, typically using location data from a positioning e.g. GPS or GNSS system. For example, roads can be described as lines, i.e. vectors (e.g. start point, end point, direction for a road, with an entire road being made up of many hundreds of such segments, each uniquely defined by start point/end point direction parameters). A map is then a set of such road vectors, data associated with each vector (speed limit, travel direction, etc), plus points of interest (POIs), plus road names, plus other geographic features like park boundaries, river boundaries, etc, all of which are defined in terms of vectors. All map features (e.g. road vectors, POIs, etc.) are typically defined in a co-ordinate system that corresponds with or relates to the co-ordinate system of the positioning system e.g. GPS system, enabling a position as determined through the positioning system to be located onto the relevant road shown in a map and for an optimal route to be planned to a destination.

Updating map data may be a time consuming and expensive task. The Applicant's WO2018/104563 describes methods in which data obtained from sensors e.g. cameras associated with a vehicle are used to generate a local map representation of an area of the road network, which may then be compared with a section of a reference map. The local map representation and the reference map section may then be compared to identify possible errors in the reference map section. If errors are found, data indicative of the local map representation may then be provided to a server for use in updating the reference map section. Thus, such methods may enable potential errors in map data to be identified based upon sensor data obtained from sensors associated with a vehicle, without the need for action by a user.

Other techniques for updating map data have been proposed based upon probe data transmitted by devices running navigation applications.

Navigation applications may be implemented by any suitable device or devices. Such navigation devices, may for example, include dedicated navigation devices or any mobile device on which a suitable navigation application is executed, (such as a mobile phone, tablet or wearable device e.g. watch), or may be implemented using an integrated in-vehicle navigation system. A vehicle environment may include multiple computing devices of any one or ones of these types which may be used to implement a navigation application.

A navigation application may cause a device running the application to periodically sample at least a current position of the device. Such a sample of positional data may be referred to as a "probe" data sample. The probe data sample includes at least the position of the device and may comprise data indicative of the time to which the position relates. Optionally other data may be included in a probe data sample. For example, a probe data sample may include a latitude coordinate value, longitude coordinate value and time value, and optionally additional information such as one or more of; a bearing, speed of travel, altitude etc. The device is arranged to transmit the probe sample data to a server. The probe samples may be transmitted individually to the server, or, to reduce the frequency with which data needs to be transmitted to the server, the device may store a set of probe data samples over a given time period, and transmit the set of probe data samples to the server. In other words, the device may send the probe data samples to the server in batches.

Such samples of positional data i.e. probe data samples may be collected by a server from multiple devices traversing navigable elements of a navigable network in a geographic area. The navigable elements may be represented by segments of an electronic map. The probe data samples obtained from a given device are indicative of the path travelled by the particular device. Analysis of probe data (i.e. sets of probe data samples) is useful in many contexts.

Probe data may be analysed to obtain information about the navigable network e.g. the configuration of the network. Historic and current probe data samples may be compared to identify situations in which there may have been a change in relation to the navigable network, and/or to identify dynamic features e.g. points of interest with respect to the navigable network. Changes in traffic density or other patterns of traffic may be indicative of possible changes in relation to the network. For example, probe data may be used in identifying changes and/or dynamic features e.g. points of interest in relation to the navigable network, such as; the availability of parking, the existence of accidents or roadworks, road closures, changes to road signs or changes in relation to points of interest. Probe data may be used, typically together with other corroborative evidence, by a map update system in order to identify when a change in relation to the navigable network is sufficiently likely that the map data should be updated.

Techniques using probe data to identify when map updates may be required are advantageous, in that potential changes may be identified in a cost effective and timely manner, without relying upon specific reports from end users or other sources, or surveying of the infrastructure. However, it has been recognised that there is a need for improved such methods, and methods for providing probe data which support such methods.

One example of a dynamic feature of the navigable network, which may be identified using a point of interest with respect to an electronic map, is the availability of parking. Techniques have been proposed in the Applicant's co-pending EP2291835 and EP2291611 to determine the availability of street-side parking locations based on end-of-trip and power-down notifications. In embodiments at least, the present invention may provide an improved method to enable the availability of parking to be identified based on probe data, and used as necessary to update an electronic map e.g. in relation to a point of interest representing the availability of parking.

SUMMARY OF THE INVENTION

In accordance with a first aspect of the invention there is provided;
a method in which a device associated with a vehicle generates and transmits probe data samples comprising positional data, the method comprising;
generating detected event sequence data indicative of a sequence of detected events relating to the vehicle,
obtaining search pattern data indicative of a search pattern of events;
using the search pattern data and at least a portion of the detected event sequence data to determine whether a pattern of detected events matching the obtained search pattern of events is present in the at least a portion of the sequence of detected events;
and wherein, when a pattern of detected events matching the obtained search pattern of events is found in the at least a portion of the sequence of detected events, the device generates a probe data sample comprising data indicative of one or both of the search pattern and the matched pattern of events, and data indicative of a position of the device associated with the matched pattern of events; the method further comprising the device transmitting the generated probe data sample.

In accordance with the invention, therefore, data indicative of a sequence of detected events relating to a vehicle ("detected event sequence data") is generated. Data indicative of a search pattern of events ("search pattern data") is obtained, and used together with the detected event sequence data to determine whether a pattern of detected events matching the obtained search pattern of events is present in at least a portion of the sequence of detected events which is considered. Where a match is found, a probe data sample is generated including data indicative of one or both of the search pattern and the matched pattern of events, and data indicative of a position of the device (and hence vehicle) associated with the matched pattern of detected events. The probe data sample is transmitted.

Thus, a probe data sample is generated containing not only positional data, but also data indicative of a specific pattern of events associated with that position that occurred in relation to the vehicle. The position may be a position at or near which the sequence of events occurred. As described below, the position may be any suitable reference position associated with the matched pattern of events, such as the position of the device and hence vehicle at the time one of the events in the matched pattern of events occurred. The matched pattern of events may be a matched sequence of events.

It will be appreciated that, depending upon the search pattern data, an exact match may or may not be required in the at least a portion of the sequence of detected event data that is considered. Thus, the matched pattern of events may or may not correspond to the search pattern data. However, even where the search pattern and matched pattern do not exactly match, the search pattern data will give an indication of the matching pattern of events. Thus, while either data indicative of the search pattern or matched pattern may be useful, it may be advantageous to include data indicative of both the search pattern and matched pattern. Preferably the probe data sample includes at least data indicative of the matched pattern of events.

The matched pattern of events is indicative of a sequence of events which occurred in relation to the vehicle. The search pattern data may be indirectly indicative of the matched pattern of events (depending upon the closeness of match required). Certain patterns of events have been found to be indicative of certain features which may be represented by an electronic map. For example, such features may be represented by a point of interest (POI) in relation to the map. Thus, by suitable selecting of a search pattern of events, the process of searching the detected event sequence data for a given search pattern of events may provide information as to the existence or any change in certain types of feature e.g. POI represented by an electronic map. The invention is particularly, although not exclusively, useful in the context of dynamic features. It has been found therefore that the probe data samples generated and transmitted in accordance with the invention may advantageously be used to in the performing of an operation in relation to electronic map data, and, in embodiments, in relation to POI data associated with an electronic map e.g. to generate, verify, modify or remove a POI associated with an electronic map.

It will be appreciated that while, for ease of reference, the searching process may be described by reference to searching the sequence of detected events, this should be understood to refer to searching the at least a portion of the sequence of detected events that is searched. As mentioned below, in some embodiments, only a more recent subsequence of the sequence of detected events may be searched. Where only a portion of the sequence of detected events is searched, that portion is a consecutive sub-sequence of the sequence of event data.

By way of example, the search pattern of events may be a search pattern of events expected to be indicative of a street parking manoeuvre by the vehicle. The detected event sequence data may then be searched for the presence of such a search pattern of events, and, if a match is found, it may be assumed that there is street parking available at a position associated with the matched pattern of events. The probe data sample generated and transmitted indicative of the search pattern of events, (which indicates the nature of POI expected to be present), and the position associated with the matched pattern of events, provides additional data which may be used in automatically performing an operation in relation to electronic map data, and more specifically in relation to POI data associated therewith e.g. adding a POI indicative of the availability of street parking at that position, or otherwise verifying an existing such POI. Of course, an operation in relation to an electronic map may not necessarily be performed on the basis of a single probe data sample transmitted in relation to a vehicle in accordance with the invention. For example, the probe data generated and transmitted may be used in conjunction with other data, e.g. other such probe data samples obtained from other vehicles, and/or probe data samples or other sources of data not obtained in accordance with the invention, in order to determine whether or not an operation is required to be performed in relation to the electronic map. In other words, other sources of data, which may or may not be obtained in accordance with the invention may be used in conjunction with a probe data sample in accordance with the invention to corroborate a change in relation to an electronic map e.g. the POI data associated therewith before making such a change.

The method may comprise using the received probe data sample in performing an operation in relation to POI data associated with the electronic map. The operation may comprise deleting, modifying or verifying data indicative of a POI associated with the electronic map or associating data indicative of a new POI with the electronic map. The method may comprise using the positional data associated with the probe data sample to identify a position with respect to the electronic map and using the data indicative of the matched pattern of events and/or the search pattern to identify a type of POI with respect to which to perform the operation.

The POI may be any POI with respect to which the search pattern of events is expected to be associated. For example and not by limitation, the POI may be selected from; an indication of the presence of street-side parking, a private parking facility e.g. indoor parking facility, vehicle repair facility, car wash facility, electric vehicle charging facility, refuelling facility or speed camera.

An operation may be performed in relation to an electronic map e.g. in relation to POI data associated therewith on the basis of e.g. in response to receiving the single probe data sample. However, it may be desirable to corroborate an indication in relation to a POI provided by the single probe data sample using other sources of data, such as similar probe data samples received from devices associated with other vehicles, or other types of data, or indeed probe data samples received from the same device at a different time e.g. on another trip performed by the same vehicle.

In accordance with the invention, detected event sequence data is generated, indicative of a sequence of detected events relating to the vehicle. The events may be detected in any suitable manner based upon data obtained from one or more sensors and/or one or more actuators associated with the vehicle. Each one of the one or more sensors and/or one or more actuators is mounted to the vehicle. The sensor(s) or actuator(s) may be associated with any system(s) or sub-system(s) of the vehicle. They may be incorporated in one or more device(s) or component(s) of the vehicle. The step of generating the detected event sequence data may comprise detecting each event based on data obtained from one or more sensors and/or one or more actuators associated with the vehicle.

By way of example, the data obtained from the one or more sensors may include data indicative of one or more button presses, a speed or acceleration of the vehicle, tyre pressure, fuel level battery charge state, engine running etc. The sensor data may comprise image data, such as camera image data, LIDAR data, GPS data etc. Data obtained from one or more actuators may include data indicative of a window movement, brakes being applied or taken off, engine being turned on or off, power being turned on or off, windscreen wipers being turned on or off, steering left or right, etc.

Each event may be detected by suitable processing of data obtained from one or more sensors and/or one or more actuators associated with the vehicle. Data from more than one sensor and/or more than one actuator, and/or from a combination of one or more sensor and one or more actuator may be used in detecting a given event.

The detected event sequence data may comprise a time ordered log of detected events.

The step of obtaining the detected event sequence data may comprise accessing the data e.g. accessing a database of such data. The method may comprise accessing a. time ordered log of detected events. However, in preferred embodiments the step of obtaining the detected event sequence data comprises generating the detected event sequence data. The step of generating the data may comprise detecting a plurality of events relating to the vehicle and storing data indicative of each event in a manner enabling a position of each event within a sequence of detected events relating to the vehicle to be determined. The events may be stored in any suitable manner enabling the order of the events to be determined directly or indirectly. For example, each detected event may be associated with time data or a number enabling the position of the event within the sequence of detected events to be determined. However, in other cases, the order of the events may simply be implied by the order of addition of the events to a log of detected events. The method may comprise detecting the plurality of events relating to the vehicle, and storing data indicative of each event in a time ordered log. Thus, the detected event sequence data may comprise a time ordered log. Where the detected event sequence data is accessed rather than being generated, the data may be of any of the forms obtained through generation in the manners described herein.

The data indicative of an event in the detected event sequence data may comprise data indicative of the type of event. The data indicative of the event may comprise an event identifier. It is envisaged that detected events may be identified as being one of a list of predetermined detectable events. Different lists may be used in respect of different vehicle types. The data may identify a given event by reference to an event code. The event code may be in the form of a character. The detected event sequence data may therefore comprise a string of characters, each being indicative of an event. A character as used herein may refer to a letter, number or symbol. The character may form part of a finite set of characters (which may be referred to as an alphabet). Thus, the list of predetermined detectable events may be a finite set of characters. This may enable a pattern of events to be searched using a string searching technique which seeks a given string of characters as described below.

The step of generating the detected event sequence data may be performed by any suitable sub-system. In embodiments the step is performed by a sub-system associated with the vehicle.

The method may comprise storing the generated detected event sequence data in a detected event sequence database. The method may comprise, when a new event is detected, adding the detected event to the detected event sequence database. Such a database may be stored by a sub-system associated with the vehicle (which may or may not comprise the device which generates the probe data). However, it is envisaged that in alternative embodiments a detected event sequence database may be stored remote from the vehicle. The method would then involve transmitting the generated detected event sequence data for storage e.g. to a remote server.

The detected events are events relating to the vehicle. An event may relate to the vehicle as a whole, or one or more components thereof, and may or may not relate to the movement of the vehicle. For example, an event may relate to a change in state of the vehicle or one or more component thereof, or a change in the movement of the vehicle. By way of example and not limitation, the detected events may include any one or ones of; a turn of the steering wheel to the left or right, a driver door opening or closing, a passenger door opening or closing, vehicle turned on or off, battery charge increased, fuel level increased, passenger window moved up or down, GPS or mobile network becomes connected or disconnected to a vehicle system, vehicle accelerates or decelerates, vehicle moves forward or backward slowly, brakes applied or removed while the vehicle is stationary, handbrake applied or removed, doors locked or unlocked. In general the detected events may include any one or ones of; a turn of the steering wheel, opening or closing of a door, change in battery state, change in fuel level, actuation of a window, change in connectivity of the vehicle, acceleration or deceleration, movement of the vehicle in a given direction, application or removal of brakes, locking or unlocking of doors, or any combination thereof.

The data indicative of a given event may further comprise a time and/or position associated with the event. For example, such a time and/or position may be associated with data indicative of the type of the event. The time and/or position may be any suitable reference time and/or position e.g. a time at which the event was detected and/or a position of the device (and hence vehicle) at the time of detection of the event. Such data may be stored in association with the data indicative of the type of the event e.g. in a detected event sequence database. The position data may be obtained from any suitable position sensor, such as a GPS sensor. Time and/or position data may be useful in providing a time and/or position to be associated with the matched pattern of event data included in the probe data sample in some embodiments.

The method comprises obtaining data indicative of a search pattern of events. The search pattern of detected events is any pattern which it is desired to search for in the sequence of detected events relating to the vehicle. The search pattern may be a pattern which is expected to be indicative of the existence of a point of interest (POI) with respect to an electronic map. It has been found that certain patterns of detected events may be associated with the existence of certain types of POI. By way of example, slow movements of the vehicle forward and back, in some cases in conjunction with other events, such as a handbrake being taken on or off, braking, unlocking or locking of doors, or acceleration or deceleration, may be consistent with a parallel parking manoeuvre. For an electric vehicle, an increase in the charge of the vehicle battery while the vehicle is in a power off state may be indicative of the vehicle being charged. For example and not by limitation, the POI may be selected from; an indication of the presence of on-street parking, a private parking facility e.g. indoor parking facility, vehicle repair facility, vehicle wash facility, electric vehicle charging facility, refuelling facility or speed camera.

By way of example, the search pattern of events may comprise one or more events (or a sequence of events) expected to be associated with any one or ones of; a parking manoeuvre e.g. parallel parking, where applicable the charging of the vehicle or the refuelling of the vehicle, entry or exit into a parking facility, repair of the vehicle, washing of the vehicle in an automated vehicle wash facility, movement in the region of a speed camera.

As described in more detail below, the events may include events required to implement the manoeuvre e.g. for a parallel parking manoeuvre these may include slow movement forward and backward and steering actions, but may also include other events typically associated with a parking manoeuvre e.g. handbrake on or off, braking, door lock or unlock, acceleration or deceleration. In some preferred embodiments, the events in the pattern of events are events expected to be associated with a parking e.g. parallel parking manoeuvre. The pattern of events may then be indicative of the availability of on-street parking.

The search pattern may be indicative in any manner of what is required in the sequence of detected events to provide a match. In embodiments, the step of using the search pattern data and detected event sequence data to determine whether a match is present is performed by a pattern search engine. The search pattern may be data which may be used to configure the pattern search engine to seek a matching event pattern in the detected event sequence. Such a pattern search engine may be implemented by an appropriate module, e.g. a software module (such as an applet, script or code) which may form part of a navigation application. The navigation application may be an application running on the same device which generates and transmits the probe data or another device associated with the vehicle, although this need not be the case.

The data indicative of the search pattern may comprise the search pattern or any data which enables the search pattern to be obtained. The data may comprise a compressed or hashed version of the search pattern, for example. In exemplary embodiments, the search pattern may be a search string, or a regular expression, and the data indicative of the search pattern may be the search string or regular expression.

The search pattern data indicative of a search pattern of events may be obtained from any suitable source. In some embodiments the search pattern data is received from a search pattern providing sub-system. Such a sub-system may be implemented by an appropriate module, e.g. a software module (such as an applet, script or code) which may form part of a navigation application. The navigation application may be an application running on the same device which generates and transmits the probe data or another device associated with the vehicle. For example, search pattern data e.g. search strings may be integrated into the software of a navigation application run by the device (i.e. integrated into the navigation client). However, in yet other embodiments, it is envisaged that the search pattern providing sub-system may not necessarily be associated with the vehicle. For example, this could be implemented using a server which may then transmit the search pattern data for use in the techniques described herein. Thus, in some embodiments the search pattern data may be generated by a server and transmitted to the device for use in the methods described herein. The search pattern data may be obtained by the device during start up or during configuration of a navigation application run by the device. This may occur automatically where a user has enabled the pattern matching and generation of probe data relating to matched patterns described herein. A server may generate search pattern data and distribute the data to a plurality of devices. The devices may be navigation devices i.e. devices running a navigation application arranged to perform the methods described herein using received search pattern data.

A search pattern providing sub-system, whether implemented by a device or server or otherwise, may obtain the search pattern data for use in the methods described herein in any suitable manner. For example, the method may extend to the sub-system generating such data or obtaining the data from a database e.g. of predefined search patterns.

The step of obtaining e.g. receiving search pattern data indicative of a search pattern of events may occur at any desired time or times. For example, the step may occur at a predefined time interval, or whenever a new event is detected, or every nth detected event etc. The pattern matching process may be triggered by the receipt of the search pattern data e.g. from a search pattern providing subsystem.

It will be appreciated that the step of obtaining the search pattern data and obtaining the detected event sequence data may occur in any order, or simultaneously.

The search pattern data may be obtained by (e.g. received by) any suitable sub-system of a system implementing the methods disclosed herein. For example, the search pattern data may be received by a search engine which is arranged to perform the step of using the search pattern data and the detected event sequence data to determine whether a pattern of detected events matching the obtained search pattern of events is present in the sequence of detected events. Such a search engine may be implemented by an appropriate module, e.g. a software module (such as an applet, script or code) which may form part of a navigation application. The navigation application may be an application running on the same device which generates and transmits the probe data or another device associated with the vehicle. In embodiments, the search engine is implemented by a sub-system associated with the vehicle e.g. provide by the or a device or devices associated with the vehicle. However, again, it is envisaged that the search engine might alternatively be implemented by a server. In such embodiments, the server would need to have access to the search pattern data and the detected event sequence data. The search engine may be any type of search engine which may process an obtained search pattern, such as a regular expression engine.

It will therefore be seen that, while in some embodiments, the steps of generating the detected event sequence data, obtaining the search pattern data and using the search pattern data and detected event sequence data to determine whether a match exists, and then generating the probe data if appropriate, may all be performed by sub-systems associated with the vehicle, or may all be performed by one or more server, or may be performed using any combination of vehicle based sub-system(s) and server(s). If such steps are performed by a server, the necessary data for use in generating the detected event sequence data i.e. sensor and/or actuator data would need to be transmitted to the server. In some preferred embodiments the steps are all performed by sub-systems associated with the vehicle. This may provide a more bandwidth efficient system. The steps may all be implemented by appropriate modules of a navigation application. The navigation application may be run on one or more devices associated with the vehicle including the device that generates and transmits the probe data sample.

The search pattern data may be obtained (e.g. received from) any suitable sub-system of a system implementing the methods described herein. In some embodiments, the search pattern data is received from a server, such as a map server. The search pattern may thus be obtained e.g. generated by the map server for use in obtaining information in relation to a given type of POI. The step of obtaining the search pattern data may comprise receiving the data from a server (i.e. wirelessly using an over the air (OTA) interface). In yet other embodiments, the search pattern data may be obtained locally, e.g. by a sub-system associated with the vehicle. In either case, whether obtained locally or from a remote server, the search pattern data may be generated or retrieved from a database of such data. For example, a database may be provided comprising data indicative of a plurality of search patterns of events. Each such pattern may be associated with a given type of POI and/or a search pattern identifier. Combinations of these options are also envisaged. For example, a search pattern identifier may be received from a remote server and used to obtain the required search pattern from a locally stored database of search patterns. Obtaining the search pattern data may thus involve receiving data indicative of the search pattern and/or retrieving such data from a database.

Wherever the various steps of the method are implemented, the search pattern data may be indicative in any suitable manner of the search pattern of events. In some embodiments the search pattern data is associated with a search pattern identifier. Such an identifier may usefully be included in the generated probe data when a match is found, as described below.

The method involves using the data indicative of the search pattern and the detected event sequence data to search the detected event sequence data for a pattern of events which may be considered to be a match for the obtained predefined search pattern of events. In some embodiments, the data indicative of the sequence of detected events comprises a plurality of characters, and the search pattern of events comprises a search string of characters. Each character in the sequence of detected events may be indicative of a given type of detected event. The method may then comprise searching the sequence of detected events for a matching string of characters. Such a step may be performed using a suitable string searching algorithm. The characters forming the sequence of detected events provides a text to be searched using the search string. Each character used in the sequence of detected events may form one of a finite set of characters defining available types of detected event. The characters may include any one or ones of letters, numbers and symbols.

The step of using the search pattern data and the detected event sequence data to determine whether a matching pattern of detected events is present involves using at least a portion of the generated detected event sequence data. Thus, the step may involve using all or a subset of the generated detected event sequence data. At least a most recent portion of the sequence of detected events is used. Where only a subset of the data is used, the subset comprises a plurality of detected events. The events are consecutive events. For example, in some embodiments only a most recent subset of the detected event sequence data may be used, such as a subset starting from the time of an immediately preceding match between a pattern of detected events and the sequence of detected events being found. This may be achieved by specifying resetting a timing offset associated with a pattern search engine each time that a match is found.

In some embodiments, the search pattern of events specifies an exact set of ordered events that must be found in the at least a portion of the sequence of detected events for a match to be determined. Thus, only one set of ordered detected events will provide a match for the search pattern of events. In a simple case, the search pattern data may indicate a string of characters required to be found in at least a portion of the sequence of detected events relating to the vehicle in order to provide a match. In these embodiments, a match is determined where the exact sequence of characters in the string of characters according to the search pattern data is found in the at least a portion of the sequence of detected events.

However, it has been recognised that, in some cases, it is desirable for the search pattern of events to be such that any one of multiple sets of ordered detected events found in the at least a portion of the sequence of detected events may provide a match. In other embodiments therefore, the search pattern of events specifies a pattern of events that may be satisfied by any one of multiple different sets of ordered detected events being found in the at least a portion of the sequence of detected events. This reflects that there may be some variation in the detected events associated with certain types of POI. For example, returning to the parallel parking example, provided that a slow forward event is followed by a slow backward event before a vehicle off event occurs, any one of a number of different detected events e.g. hand brake on or off, steering wheel left or right may be permissible between these required events. The exact sequence of detected events which may be associated with a parallel parking manoeuvre may depend upon factors such as the level of skill of the driver, the size of the available parking space relative to the size of the vehicle etc. Thus, it is desirable that a match may be found in any one of a range of scenarios which match the basic pattern of detected events associated with such a manoeuvre.

In some embodiments the search pattern is defined by a regular expression. A regular expression is a sequence of characters. The sequence of characters defines the search pattern. Thus, the regular expression defines a combination of characters that must be found in the at least a portion of the sequence of detected events in order to provide a match. Each character in the regular expression is either a metacharacter or a regular character. A metacharacter has a special meaning, while a regular character has its literal meaning. The metacharacter(s) may effectively control the degree of precision required to provide a match. A regular expression operates on a text of characters. Thus, in embodiments, the search pattern may be defined by a regular expression which operates on a text provided by the at least a portion of the sequence of detected events.

Of course, string based search techniques are exemplary of only one possible form of search pattern and matching technique that may be used in accordance with the invention. Equally, rather than being text based search techniques as described above, image based searching may alternatively or additionally be used. Any suitable search technique and hence search pattern may be used, which may enable a match of any desired level of exactness to be sought in the at least a portion of the sequence of detected events. For example, other search techniques which may be used include, non-deterministic finite automatons, deterministic finite automatons, recursive descent parsers, trigram searches, fuzzy searches, etc.

The step generating detected event sequence data may be performed on a continual basis.

The step of using the search pattern data and detected event sequence data to determine whether there is a match between the search pattern and a pattern of detected events in the at least a portion of the sequence of detected events may be performed at any desired time. For example, this step may be performed periodically, and/or may be triggered by the addition of a new event to the sequence of detected events. The step may thus be performed on multiple occasions using the same search pattern data and different sets of detected event sequence data.

The method may alternatively or additionally be performed in relation to one or more further set of search pattern data. Any such further set of search pattern data may be obtained in the same manner described in relation to the (first set). For example, sets of search pattern data may be obtained for use in determining matches indicative of different types of POI. The search may be performed in relation to any further set of search pattern data at more than one time e.g. periodically, or triggered by the addition of a new event. The pattern search engine scans the sensor event sequence periodically (or when an event has been added). When a matching pattern has been found, the pattern search engine sets an offset at which to continue searching for a new pattern. This offset into the sensor event sequence is initially set to the beginning of the sequence at the start of the navigation client application. Where a search is performed in relation to one or more further set of search pattern data, the searching may be performed in relation to different search patterns sequentially or concurrently. Thus, search patterns may be processed in series or parallel.

In accordance with the invention, when a matching pattern of detected events is found in the at least a portion of the sequence of detected events, a probe data sample is generated by the device associated with the vehicle. The finding of a matching pattern of detected events may trigger the generation of the probe data sample.

The probe data sample that is generated in accordance with the invention in any of its aspects or embodiments includes at least data indicative of the matched pattern of events and/or the search pattern, and data indicative of a position of the device associated with the matched pattern of events. Preferably at least indicative of the matched pattern is included (and the position data).

The probe data sample may be in the form of a message comprising the at least matched pattern and/or search pattern and position data.

The position data may be indicative of any reference position associated with the matched pattern of events. For example, the position data may be associated with the data indicative of one of the events in the matching pattern of detected events of the detected event sequence data. Alternatively, the position data may be indicative of a position of the device at a time that the search pattern of events is matched to a pattern of events in the sequence of detected events. The method may comprise the step of obtaining the position of the device associated with the matched pattern of events. This step may comprise obtaining a position e.g. a current position from a location sensor associated with the vehicle e.g. a GPS or similar location sensor, or retrieving the position from stored data e.g. from the stored detected event sequence data. Thus, the position data may be a current sensed position or a previously stored position.

The generated probe data may comprise additional data. For example, in some embodiments the probe data further comprises data indicative of a time associated with the matched pattern of events. This may be any suitable reference time. Similar to the position associated with the matched pattern of events, the time may be a time of finding the match e.g. a current time or a time associated with one of the events in the matching pattern of detected events of the detected events sequence data. The step of obtaining the time data may comprise obtaining a current time or obtaining a time from stored data e.g. from the stored detected event sequence data.

The generated probe data comprises data indicative of one or preferably both of the matched pattern of events found in the at least a portion of the sequence of detected events and data indicative of the search pattern of events. It will be appreciated that, depending upon how exact a match is required by the search pattern, the search pattern and matching pattern may or may not differ from one another. In some embodiments, an event search pattern providing sub-system may provide data indicative of the search pattern to a probe data sample generator in addition to a search engine sub-system. The probe data sample generator may receive data indicative of the matched pattern from a pattern search engine sub-system.

Regardless of whether a search pattern identifier is used in providing the search pattern data to the search engine, the data indicative of the search pattern provided to the probe data sample generator is preferably in the form of a search pattern identifier. In some preferred embodiments the generated probe data comprises data indicative of a search pattern identifier. The generated probe data may also include data indicative of the matched pattern of events.

The search pattern identifier may be of any form which enables the search pattern to be identified. The search pattern identifier may be a truncated or compressed form of the search pattern data e.g. an abbreviated search string. For example, the search pattern identifier may be in the form of a compressed e.g. hashed version of the search pattern. In general the search pattern identifier enables the search pattern to be identified in a manner efficient manner in terms of data size. Inclusion of the search pattern identifier in the probe data enables the search pattern which gave rise to the match to be identified while helping to limit the size of the probe data sample message.

Further information may be included in the probe data sample. For example, where the matching event search pattern is indicative of a given type of POI, additional information relating to the POI may be provided. This may enable more detailed POI data to be provided for use in performing operations in relation to an electronic map. The information may be any information available to the device providing the probe data. For example, where the matching event search pattern is indicative of a refuelling facility, the probe data sample may comprise data indicative of the type of fuel used by the vehicle. This may indicate the type of fuel available at the POI.

It will be appreciated that the device may additionally generate and transmit probe data samples including at least positional data at times other than those specified in relation to the methods described herein i.e. when a match is found between a search pattern of events and a pattern of events in the at least a portion of the sequence of detected events. For example, the device may generate and transmit probe data samples at regular intervals, or as prompted by other factors.

Upon generation of a probe data sample, the method may comprise repeating the steps of generating updated detected event sequence data, obtaining search pattern data and using the search pattern data and at least a portion of updated detected event sequence data to seek a match in relation to updated detected event sequence data relating to events occurring after the time of generation of the previous probe data sample.

The device may transmit the probe data sample as soon as it is generated, or at a later stage. Probe data samples generated in accordance with the methods described herein may be transmitted one at a time as they are generated, or may be transmitted as a batch together with other probe data samples, which may or may not have been triggered by matching patterns of events in accordance with the methods described herein. As long as each probe data sample comprises the data indicative of the matched pattern of events and a time associated therewith, it may subsequently be used e.g. by a server in methods such as operations using electronic map data.

The probe data sample is preferably transmitted wirelessly i.e. over the air interface (OTA).

The method extends to the step of receiving the probe data sample transmitted by the device and using the probe data sample to (automatically) perform an operation in relation to electronic map data. Such a step may be performed by a server e.g. a server of a map provider. The electronic map comprises a plurality of segments representing navigable elements of the navigable network, the segments of the electronic map being connected by nodes, and the method comprises reconstructing the path with respect to the electronic map. The device may be a device associated with a vehicle traversing a path through a navigable network covered by the electronic map.

The method may comprise using the received probe data sample in performing an operation in relation to POI data associated with the electronic map. The operation may comprise adding, deleting, modifying or verifying a POI associated with the electronic map. The method may comprise using the positional data associated with the probe data sample to identify a position with respect to the electronic map and using the data indicative of the matched pattern of events to identify a type of POI with respect to which to perform the operation.

The POI may be any POI with respect to which the search pattern of events is expected to be associated. For example and not by limitation, the POI may be selected from; an indication of the presence of street-side parking, a private parking facility e.g. indoor parking facility, vehicle repair facility, car wash facility, electric vehicle charging facility, refuelling facility or speed camera.

An operation may be performed in relation to an electronic map e.g. in relation to POI data associated therewith on the basis of e.g. in response to receiving the single probe data sample. However, it may be desirable to corroborate an indication in relation to a POI provided by the single probe data sample using other sources of data, such as similar probe data samples received from devices associated with other vehicles, or other types of data, or indeed probe data samples received from the same device at a different time e.g. on another trip performed by the same vehicle.

In some embodiments the method may additionally or alternatively comprise the step of storing the received probe data sample in a database.

The or each probe data sample generated and transmitted as described herein may be generated and transmitted as the device (and hence vehicle) traverses a path through a navigable network. The path may be any path from an origin location to a destination location. The path may be traversed as part of a trip by the device. The path may or may not be a path traversed while travelling along a predefined route to a destination. Thus the destination location may not necessarily be a predefined location. The path may then correspond to a path traversed by the device over a time period within which probe data sample generation by the device is controlled in accordance with the methods described herein.

The or each device may be any device having position determining capability and which may be triggered to generate and transmit probe data samples in the manner of described herein. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, wearable devices with positioning capability, position sensors, etc.

In general, the or each device may be selected from; a mobile device e.g. navigation device, wearable device, phone, laptop or tablet, or a device e.g. navigation device integrated into a vehicle. The device is preferably a device running a navigation application.

The or each device is associated with a vehicle. A vehicle may include, for example, a truck, car, motorcycle, bicycle, boat, plane etc. It will be appreciated that the vehicles may be powered in any suitable manner, and include electric vehicles. References to a device being associated with a vehicle encompass any arrangement in which the device moves with the vehicle, such that the position of the device may be taken to correspond to that of the vehicle. In some embodiments, the device is associated with a vehicle traversing a respective path. A device associated with a vehicle may be integrated with the vehicle, or may be a separate device associated with the vehicle such as a mobile device, portable navigation apparatus, or a device worn by an occupant of the vehicle etc.

The device may be associated with a vehicle moving in a geographic area covered by an electronic map i.e. along navigable elements of the navigable network represented by the segments of the electronic map. The device may be a device associated with a user.

The positional data referred to herein may comprise a set of coordinates e.g. latitude and longitude coordinates.

The device may be any device having position determining capability, and which is arranged to transmit data indicative of a current position of the device at different times e.g. at predetermined interval. The device may be arranged to transmit the data to a server, which may or may not be a server which performs other steps of the methods described herein. The device may be a device upon which a navigation application is running to cause the device to transmit positional data at different times.

The present invention extends to a system for performing the method of the invention in accordance with any of its aspects or embodiments.

In accordance with a further aspect of the invention there is provided;

a system in which a device associated with a vehicle generates and transmits probe data samples comprising positional data, the system comprising;

a sub-system for obtaining detected event sequence data indicative of a sequence of detected events relating to the vehicle, a sub-system for obtaining search pattern data indicative of a search pattern of events;

a sub-system for using the search pattern data and the detected event sequence data to determine whether a pattern of detected events matching the obtained search pattern of events is present in at least a portion of the sequence of detected events;

and wherein, when a pattern of detected events matching the obtained search pattern of events is found in the at least a portion of the sequence of detected events, the device is arranged to generate a probe data sample comprising data indicative of one or both of the search pattern and the matched pattern of events, and data indicative of a position of the device associated with the matched pattern of events in the sequence of detected events; the device further being arranged to transmit the generated probe data sample.

The present invention in these further aspects may include any or all of the features described in relation to the first aspect of the invention, and vice versa, to the extent that they are not mutually inconsistent. Thus, if not explicitly stated herein, the system of the present invention may comprise a sub-system or means for carrying out any of the steps of the method described.

The system comprises the device associated with the vehicle, and may comprise one or more other devices and/or servers. The system may be a distributed system including the device associated with the vehicle. Such a system may further comprise a server and optionally one or more other vehicle sub-system. Each sub-system referred to in relation to this further aspect of the invention may be provided by a server, or a sub-system associated with the vehicle which may or may not comprise the device which generates and transmits the probe data. Each sub-system may be referred to as "means" for carrying out the step mentioned.

The sub-system or means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, data indicative of the search pattern of events, sequence of detected events and/or the probe data or subset(s) thereof.

The methods of the present invention are computer implemented methods. The methods of the present invention involved in generating and transmitting the probe data (e.g. the steps of generating the detected event sequence data, obtaining the search pattern data and using the search pattern data and detected event sequence data to determine whether a match exists, and, if so, generating and transmitting probe data) are, in preferred embodiments, implemented by one or more device associated with the vehicle. Each such device may be arranged to run a navigation application. Thus, in embodiments, the system of the present invention comprises a set of one or more devices associated with the vehicle comprising the means or sub-system(s) for carrying out the various steps described, and the method steps described herein are carried out by such a set of one or more devices.

Any steps involving the use of the probe data sample(s) generated and transmitted in accordance with the method of the present invention in any of its aspects or embodiments e.g. to perform an operation on relation to electronic map data are advantageously performed by a server e.g. a server of a map data provider.

It will be appreciated that the network of navigable elements, and any navigable element, as referred to herein, are navigable elements of a real world or physical navigable network. The network is represented electronically by electronic map data. The electronic map data may be stored by or otherwise accessible by the server, in embodiments in which the method is implemented using a server. In the electronic map data, the navigable network is represented by a plurality of segments connected by nodes. Each segment of the electronic map represents at least a portion of navigable element of the navigable network.

The various functions of the technology described herein can be carried out in any desired and suitable manner. For example, the functions of the technology described herein can be implemented in hardware or software, as desired. Thus, for example, unless otherwise indicated, the various functional elements, stages, and "means" or "sub-systems" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/ or any one or more or all of the processing stages and processing stage circuitry/circuits may be at least partially formed of shared processing circuitry/circuits.

The present invention may be implemented in relation to paths through navigable networks comprising navigable elements of any type. Preferably the navigable elements are road elements (of a road network). While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network.

The methods in accordance with the invention in any of its aspects described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CDROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

Any of the methods in accordance with the present invention may be implemented at least partially using software, e.g. computer programs. The present invention thus also extends to a computer program comprising computer readable instructions executable to perform a method according to any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which:

FIG. 10 is a flow chart illustrating one embodiment of a method in accordance with the invention;

DETAILED DESCRIPTION OF THE FIGURES

A system which may be used to implement the present invention will now be described by reference to FIGS. 1-5. Embodiments will now be described with particular reference to a Portable Navigation Device (PND). It should be remembered, however, that the teachings of the present invention are not limited to PNDs but are instead universally applicable to devices able to transmit probe data samples to a server, including, but not limited to, any type of processing device that is configured to execute navigation software in a portable manner so as to provide route planning and navigation functionality. Some exemplary such devices are described below by reference to FIGS. 6 and 7. It follows therefore that in the context of the present application, a navigation device is intended to include (without limitation) any type of route planning and navigation device, irrespective of whether that device is embodied as a PND, and includes a device integrated into a vehicle such as an automobile, or indeed a portable computing resource, for example a portable personal computer (PC), a mobile telephone or a Personal Digital Assistant (PDA) executing route planning and navigation software. The present invention is also applicable to devices which may transmit probe data samples which may not necessarily be configured to execute navigation software, but which transmit probe data samples and are arranged to implement the other functionality described herein.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that where route planning is performed, this may occur even in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
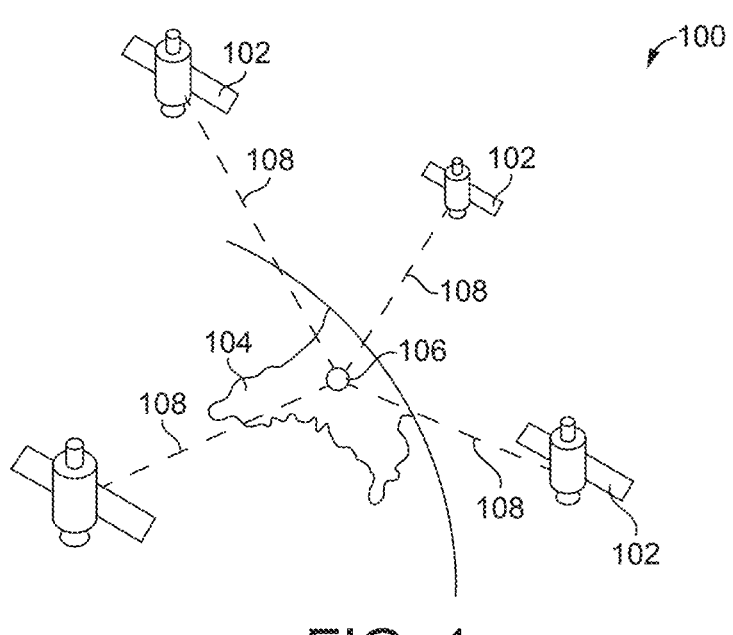
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
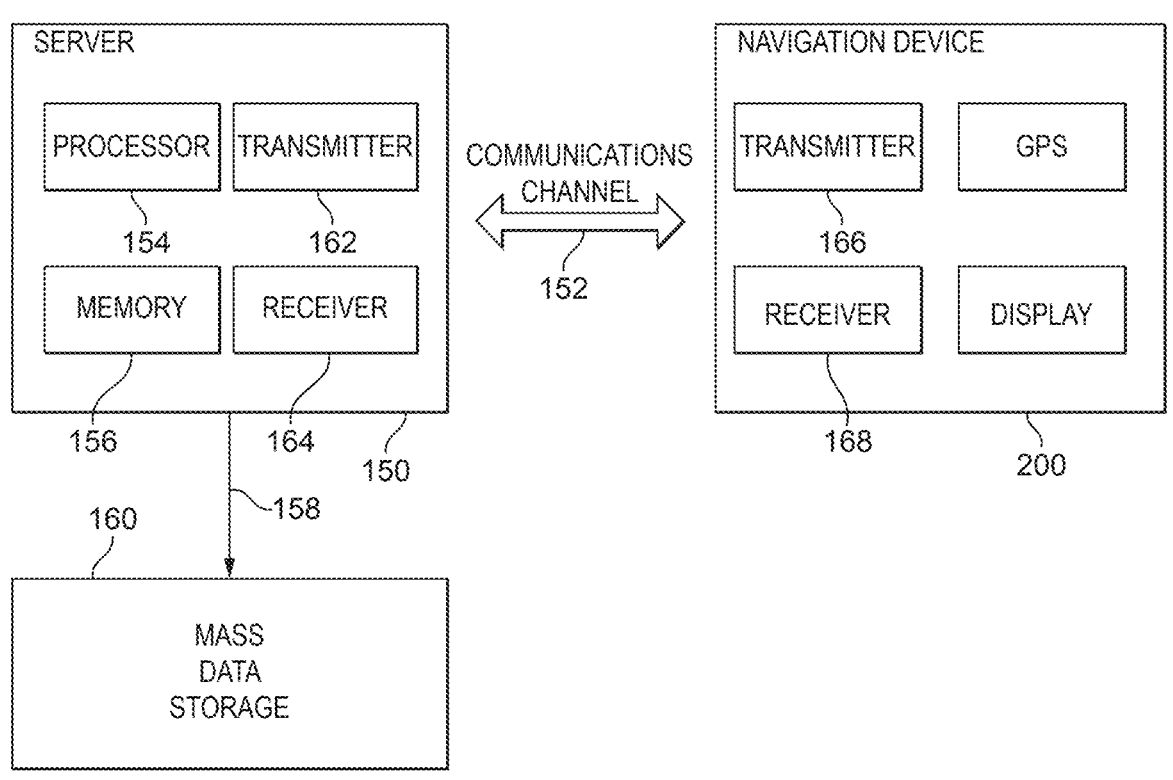
FIG. 2 is a schematic diagram of a communications system for communication between a navigation device and a server.

Turning to FIG. 2, a navigation device 200 (e.g. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
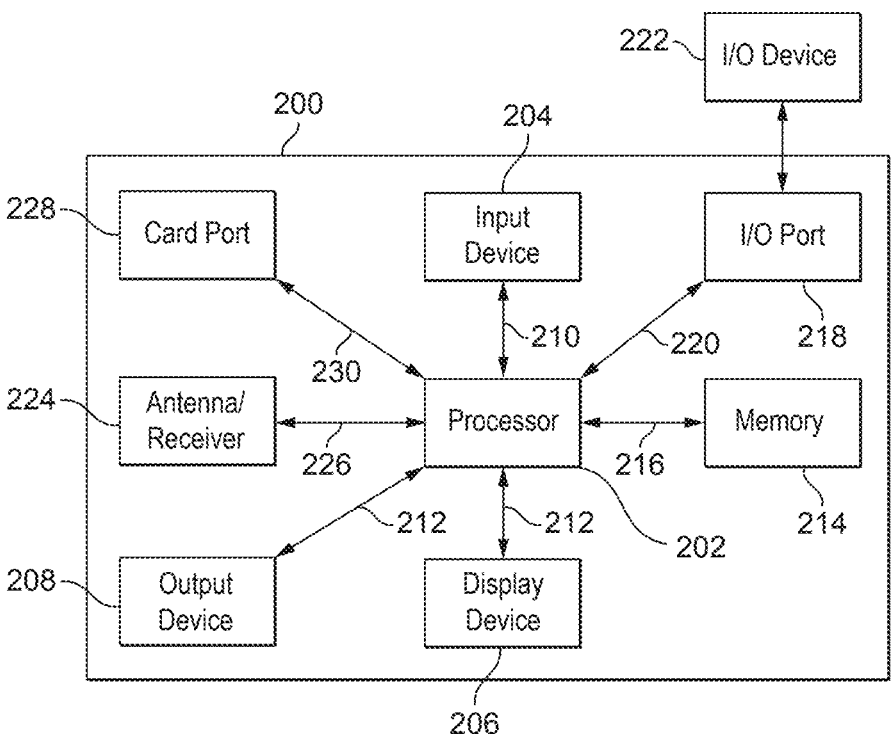
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/ send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or an input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
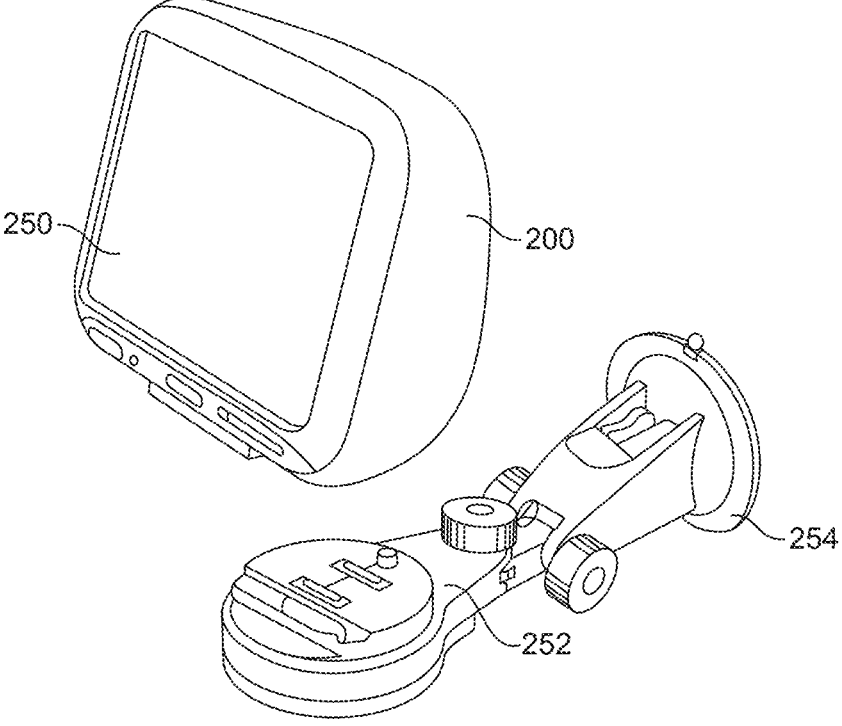
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard, window or the like using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Of course, the navigation device need not be provided by a PND type device as illustrated. A wide range of general computing devices may, when running a navigation client, as described below, provide the functionality described by reference to the navigation device 200, and may communicate with a server in the same manner.

Figure 5:
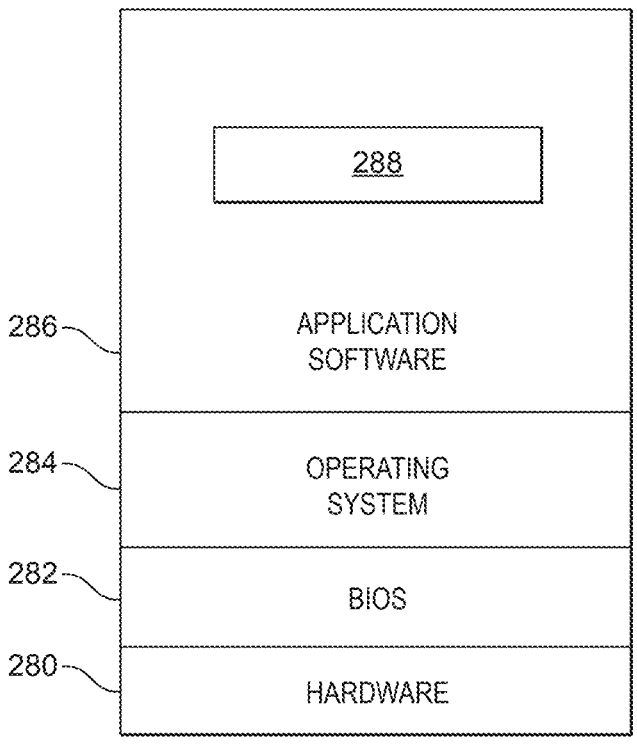
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, when triggered in accordance with the methods described herein, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, and a time stamp. Such data is referred to herein as a probe data sample.

Further, the processor 202 is arranged to upload each probe data sample (i.e. the GPS data and the time stamp) to the server 150. The navigation device 200 may have a permanent, or at least generally present, communication channel 152 connecting it to the server 150.

In the embodiment being described, the probe data samples provide one or more trace, with each trace representing the movement of that navigation device 200 within an applicable period e.g. while traversing a given path. The server 150 is arranged to receive the received probe data samples and to store these as a record of the whereabouts of the device within the mass data storage 160 for processing. Thus, as time passes the mass data storage 160 accumulates a plurality of records of the whereabouts of navigation devices 200 which have uploaded probe data samples. The server may restructure probe data samples forming a trace e.g. by associating a common element, such as the device identifier value or the period to which the data relates, to the trace as a whole, rather than to each of the probe data samples that make up the trace. After moving common elements to the trace level, the individual probe data samples in the trace may at least contain the location values and a time offset within the period to which the trace relates (e.g. a time since start of a period or a sequence number).

As discussed above, the mass data storage 160 also contains map data. Such map data provides information about the location of road segments, points of interest and other such information that is generally found on map.

As mentioned above, the term "navigation device" as used herein should be understood to encompass any form of device running an appropriate navigation client, and is not limited to the use of a specific use PND type device as illustrated in FIG. 4. A navigation client is a software application that runs on a computer device. Navigation devices may be implemented using a wide range of computing devices. Some exemplary such devices are shown in FIG. 7.

Figure 6:
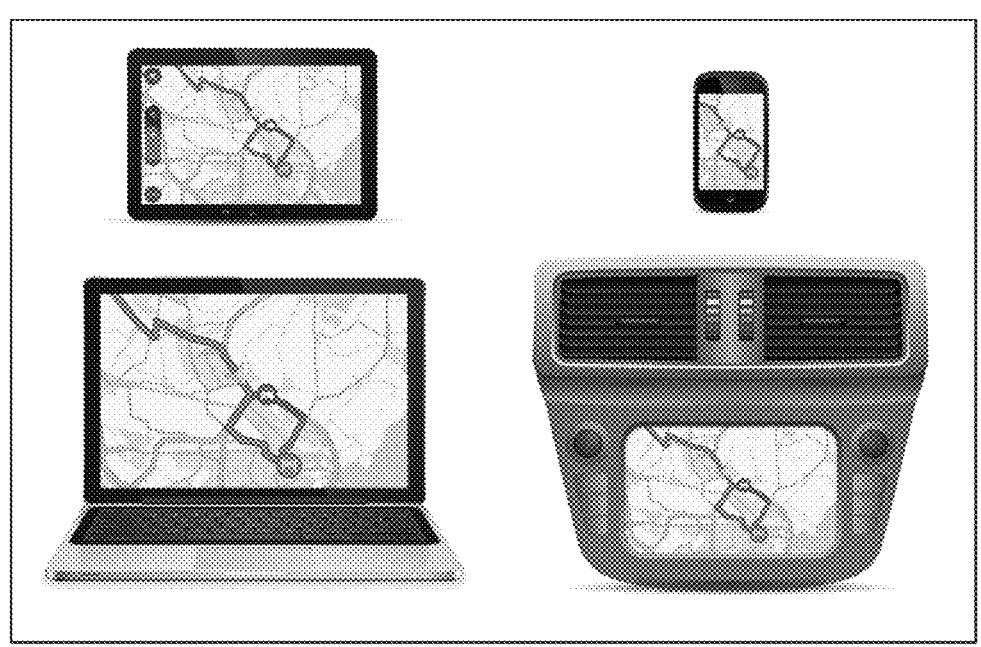
FIG. 6 illustrates various forms that a navigation device may take.

The devices in FIG. 6 all include a navigation screen for assisting a user to navigate to a desired destination. These include a personal navigation device (PND), which is a single purpose computing device (upper left), a general purpose computing device in the form of a mobile phone (top right), a laptop (bottom left) and an in-vehicle integrated computing device (bottom right). Of course, these are merely some examples of a wide range of general computing devices which may be used to run a navigation client. For example, tablets or wearable devices, such as watches may be used.

Figure 7:
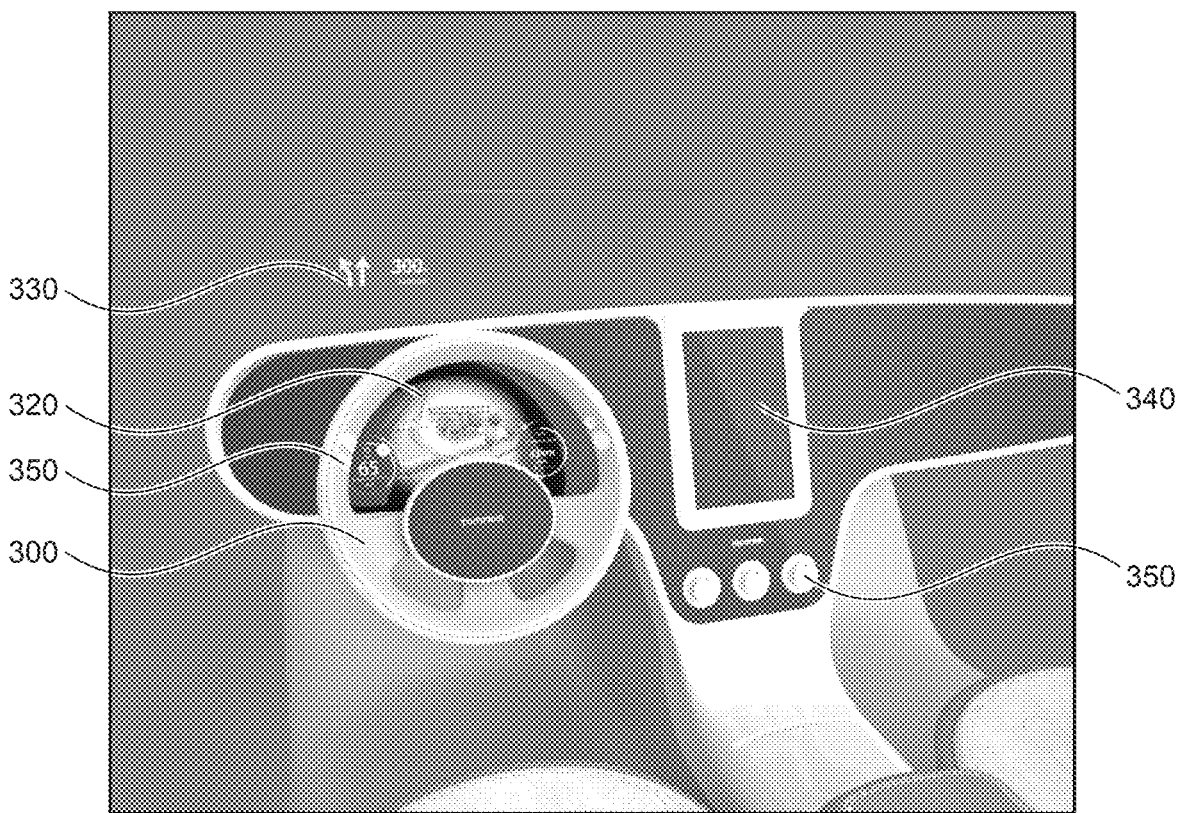
FIG. 7 illustrates various devices which may be associated with a vehicle.

A vehicle may have multiple computing devices and multiple displays in support of the driver as shown in FIG. 7. FIG. 7 shows the interior of a car with a steering wheel 300, a first display area 320 behind the steering wheel, a heads-up display 330 projected onto the front window, a centre display 340 and a plurality of controls (buttons, touch screen) 350. In addition, the car may support the adoption of mobile devices into the car computer environment.

Figure 8:
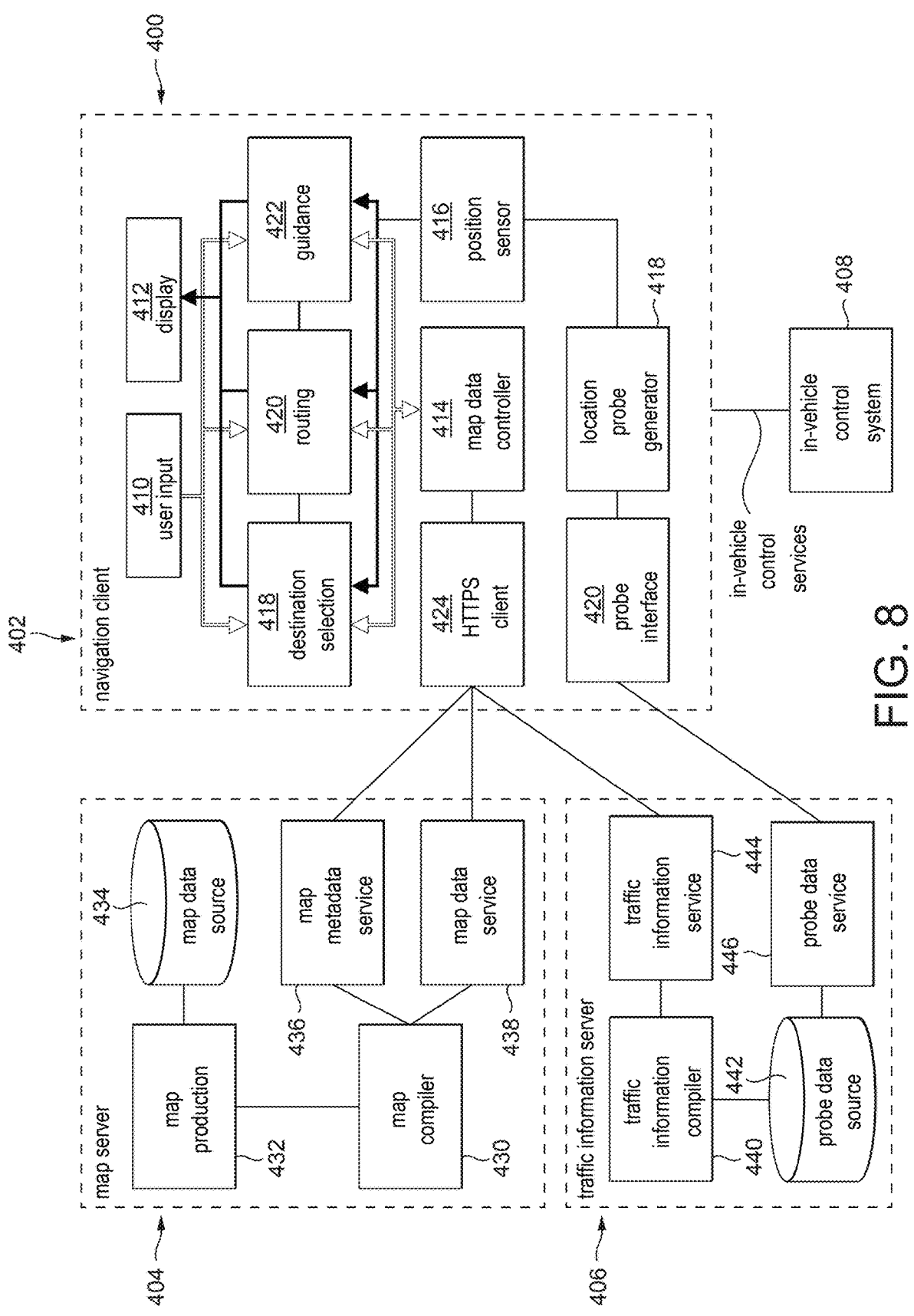
FIG. 8 illustrates another exemplary navigation system.

A functional diagram of another exemplary navigation system 400 is shown in FIG. 8. The system includes a navigation client 402, which may be provided by a software application running on any suitable computing device, as exemplified by reference to FIGS. 6 and 7. The system 400 also includes a map server 404, a traffic information server 406 and an in-vehicle control system 408. These components are described in more detail below. It will be appreciated that the navigation system will include a plurality of navigation clients 402 in communication with the map server 404 and traffic information server 406.

Navigation Client 402

The navigation client is provided by a navigation application running on a computing device. The navigation client 402 provides user input and output devices 410, 412 as common to most computing devices. The navigation client also provides a map data controller 414 that obtains and stores map data in the non-volatile memory of the computing device on which the navigation application providing the client is run. The navigation device on which the navigation application is run also includes a position sensor 416, in addition to conventional computing device components such as a processing unit, a memory, a display, a long term storage (flash memory), a networking interface. Such more conventional components are not shown in FIG. 8, which illustrates those components more relevant to supporting navigation functionality.

The navigation client 400 operates using an electronic map of a geographic area. The map information may be stored locally on the device (e.g. in non-volatile, solid state memory) or may be retrieved from a navigation server. The navigation client uses the electronic map to generate a map view of a geographic area of interest on the display of the computing device. Usually, the geographic area is centered around a current location of the computing device executing the navigation client software application.

The current location is determined using the position sensor 416, which may use any of a broad range of location sensing technologies such as satellite positioning (GPS, GNSS, . . . ), WiFi (wireless triangulation), Mobile phone tracking, BlueTooth beacons, image analysis (examples of which are described in the Applicant's PCT/EP2016/068593, PCT/EP2016/068594, PCT/EP2016/068595, and PCT/IB2016/001198, the entire content of which is herein incorporated by reference), Map matching, Dead reckoning, and other position sensing techniques. In the presence of position sensing errors map matching may be used to adjust the measured position(s) to best match a road segment on a map.

The navigation client 402 can assist a user with navigating from the current location to a destination location. The destination can be entered using a destination selection module 418. A routing module 420 of the navigation client calculates the route to the selected destination. The routing module 420 also obtains current traffic information in addition to the electronic map to determine an estimated travel time or an estimated time of arrival. The current traffic information describes the current situation on the road network in the geographic area of the electronic map. This includes current average speed, current traffic density, current road closures and so on. The routing module 420 may present a preferred route as well as alternative routes enabling the end-user to select a preferred route.

A guidance module 422 of the navigation client uses the selected preferred route to guide the end-user to the selected destination. It may use the display showing the map and a part of the route to the destination. The guidance also may take the form of additional graphical indications on the display. Most navigation clients also support audio guidance with turn by turn instructions.

Active navigation clients generate location probes and provide these to the traffic information server that uses these probes to calculate and update the traffic information. The navigation client 402 includes a location probe generator 418 and a probe interface 420 for implementing these functions.

The navigation client 402 also includes an HTTPS client for communicating with the map server 404 and traffic information server 424.

Map Server 404

The map server 404 is an infrastructure for storing, managing and creating a large amount information for creating electronic maps and the use of the electronic maps for navigation. The map server may be provides by a cloud server system.

The map server 404 includes a map compiler 430 that receives map data from a suitable map production unit 432. The map production unit 432 receives map source data from map data source 434 and converts this into a suitable format for inclusion in the electronic map. For example, the map compiler 430 may sort map data into respective layers and tiles for an electronic map. The map server 404 further includes a map data service 436 and a map metadata service 436. The combination of map data service 436 and map metadata service 436 may together be referred to as a "cloud service". The HTTPS client 424 may retrieve map metadata from the map metadata service 436, and then, as required, may use the metadata to retrieve the map data from the map data service 438.

A typical navigation server manages map information associated with $10^7$-$10^8$ kilometer of road networks for a wide range of countries (around 200 countries). The map information needs to be of high quality, so the server infrastructure processes updates to the map information, with an update rate averaging around 1000 updates per second. In addition the map information needs to be distributed to a global infrastructure of navigation clients. The distribution requires a sophisticated content distribution network in addition to cloud computing systems to generate the map information to be distributed. The navigation server also aggregates, processes and distribute real time traffic information.

Traffic Information Server 406

The traffic information server 406 includes a traffic information compiler 440 which compiles traffic information using data obtained from a probe data source 442. The probe data source 442 receives data from a probe data service 446, which, in turn, is configured to receive probe data from navigation clients. The traffic information compiler 440 provides traffic information to a traffic information service 444, which communicates with the HTTPS client 424 to provide traffic information thereto.

The traffic information server 406 provides road and traffic information to the navigation client 402.

Map information usually contains static traffic information based on historic data. For more dynamic traffic information such as traffic densities, parking availability, accidents, road closures, updated road signs, and points of interest, the traffic information server receives location probe data from navigation clients. The traffic information compiler uses the current location probe data obtained from multiple navigation clients to generate current traffic information.

Location Probe Data

During normal operation the navigation client 402 periodically sends location probe data to the traffic information server 406. The location probe data comprises information about a recent or current location of the navigation client. The location probe data may be combined into a set of probe data elements, usually referred to as a trace. The traffic information server 406 uses the trace or the probe data to estimate current traffic information. This information comprises parameters for road segments such as current average speed and current traffic density. The traffic information server 406 processes the location probe data to provide real time traffic information to the navigation client 402 enabling better route generation and improving estimated travel times to a destination.

The term location probe (or 'probe') refers to a data sample including at least positional information, indicative of a position of the navigation client i.e. the device implementing the client. Typically the position data will include a longitude value and a latitude value (both with a typical accuracy of around 10 meters). The probe data sample may include other data, such as a time value. The time value provides a time associated with the position data, and may be received from the positioning system, so as to correspond to the time at which the position data was generated, or may correspond to the time of transmission of the probe data sample. The probe data sample may also include a device identifier value (uniquely associated with an end-user device and a user).

The term trace describes a set of location probes that are associated with the same device, user, and a common period. The trace data can be restructured at the server e.g. by associating a common element such as the device identifier value or a time period to which the probe data relates to the trace rather that to each of the probes that make up the trace. After moving common elements to the trace level, the individual probes in a trace at least contain the location values and a time offset within the period (e.g. a time since start of a period or a sequence number).

Figure 9:
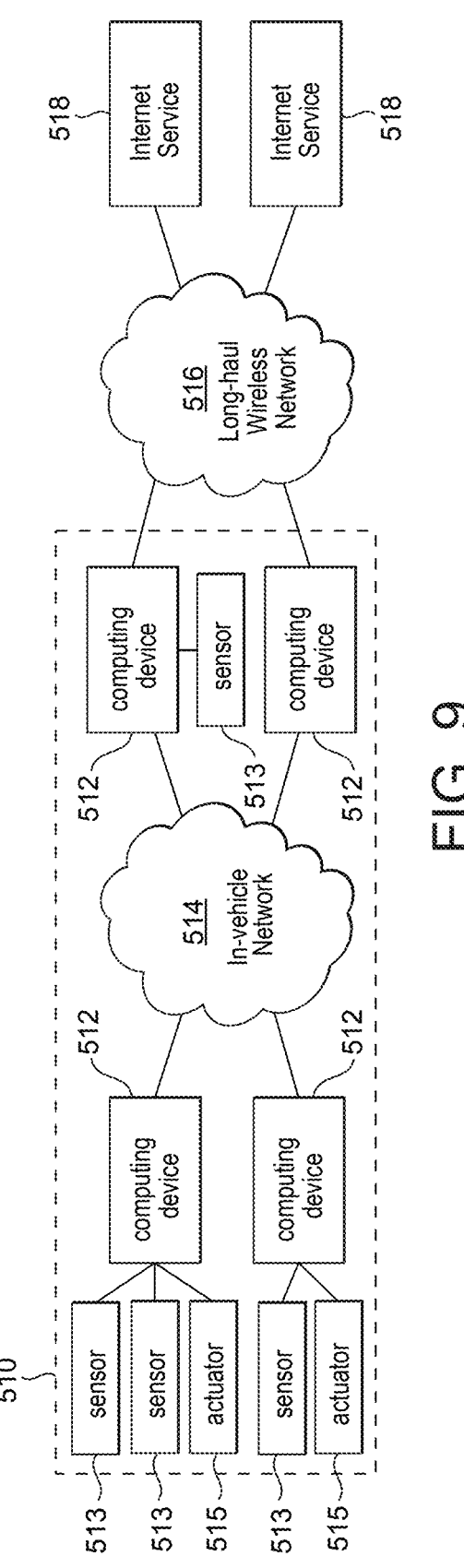
FIG. 9 illustrates an example of one system 500 which may be used in implementing embodiments of the present invention.

FIG. 9 illustrates an example of one system 500 which may be used in implementing embodiments of the present invention. As shown, a vehicle 510 includes an interconnected set of devices 512 that are able to communicate with each other through an in-vehicle network 514. Some of the devices 512 are also connected to a long-haul wireless network 516 (such as a cellular phone network, GSM G1-G4, G5, Narrowband-IoT, LoRa, etc.) which provides access to one or more internet service(s), e.g. via a server 518.

FIG. 9 shows several devices 512 attached to the in-vehicle network. Each device 512 typically contains a processor, some memory and a network interface. At least some of the devices 512 are also equipped with one or more sensors 513, e.g. a microphone, a camera, an accelerometer, a positioning sensor, a proximity sensor, a radar, a laser range finder, an ambient light detector, and so on. Some of the devices 512 may be embedded into the vehicle, such that their sensor(s) 513 have a fixed orientation. However, some of the devices 512 may belong to a user, such as a user's smartphone, and may thus need to be mounted in place before they can be reliably used.

Any devices 512 connected to the in-vehicle network 514 may be configured to share their resources (e.g. sensors 513) with other devices 512 in the network 514. For example, a mobile device may be enabled to access video sensors embedded in devices embedded into the vehicle. Similarly, an application running in an embedded device may be enabled to access to the long-haul wireless network of a mobile device. The devices 512 may thus communicate within an 'internet of things' type infrastructure that allows them to share resources.

The sensors, actuators, computing devices and in-vehicle network may provide an in-vehicle control system of the type referred to as "408" in FIG. 8.

At least one of the devices 512 may be running a navigation application to provide a navigation client in the manner described in relation to FIG. 8. As described above, the navigation application may assist the user in navigating to a new destination, or it may merely provide relevant information for navigating to a commonly used destination (home, work, etc.). In both modes, the navigation application may use locally stored map information and receive map information from a map server using the long-haul wireless network 516.

The map server 516 (or map server 434 in FIG. 8) provides a wide range of map information. It will be appreciated that the map information related to road network is relatively static and map updates can be scheduled well in advance as roadworks may take months to years to complete. However, other map information such as traffic densities, accidents, road closures, updated road signs, points of interest, and so on, may be more dynamic. The map content provider can observe location data points from navigation applications to detect differences between historic navigation data and recent navigation data. Such differences may point to a change in map information. This and other types of reports are handled by a map update system.

Some embodiments of the present invention will now be described by reference to FIGS. 10-12.

In embodiments at least, methods in accordance with the present invention may provide data which may be used by a map update system to determine whether a map update may be required, in particular, although not exclusively in relation to POI information associated with the electronic map. The methods of the present invention enable such data to be generated automatically and provided to a map update server.

In accordance with the invention, probe data samples are generated that also contain an indication of a specific sequence of detected events that occurred in a vehicle near to the position associated with the probe data sample. The detected events are events detected based upon data obtained from one or more sensors and/or one or more actuators associated with the vehicle. The probe data provides additional information that a map server can used in determining whether a map update is required, in particular in relation to POI data associated with the map. For example, a map update system may automatically generate, modify or remove a map POI based on the received probe data.

Embodiments of the invention will be described in relation to a system including a navigation client associated with a vehicle. As described above, the navigation client may be provided by a suitable software application running on any navigation device associated with the vehicle. For example, the navigation application may be implemented using a software application, an applet, etc.) Any of the systems illustrated by reference to FIG. 1-9 above may be suitable for use in implementing methods in accordance with the invention.

The navigation application may be modified to enable it to perform additional functionality for implementing methods in accordance with the invention.

One embodiment of a method in accordance with the invention is illustrated in the flow chart of FIG. 10. The steps described are performed by the navigation application of the navigation client. Of course, other arrangements are possible. The navigation client forms part of a system including one or more server. Any one or ones of the steps described herein may alternatively be implemented using a server (although this would involve additional transmission of data between the vehicle system e.g. sensor/actuator data and the server(s)).

In step 1, data indicative of a sequence of detected events relating to the vehicle is generated ("detected event sequence data"). The detection of sensor events involves processing of data obtained from one or more sensors and/or one or more actuators associated with the vehicle. As illustrated in FIG. 9, a number of sensors and actuators will communicate with an in-vehicle network via one or more computer devices. A computer device, such as 512 in FIG. 9, running a navigation application, may obtain sensor and/or actuator data from the in-vehicle network for use in accordance with the methods described herein.

Sensor data may include (button presses, car speed, tyre pressure, fuel level, battery charging state, engine running, camera image, LIDAR data, GPS data, etc. Actuator data may include data indicative of operations such as window down, brakes on, engine on/off, power on/off, windscreen wiper on/off, steer left/right, acceleration.

Figure 11:
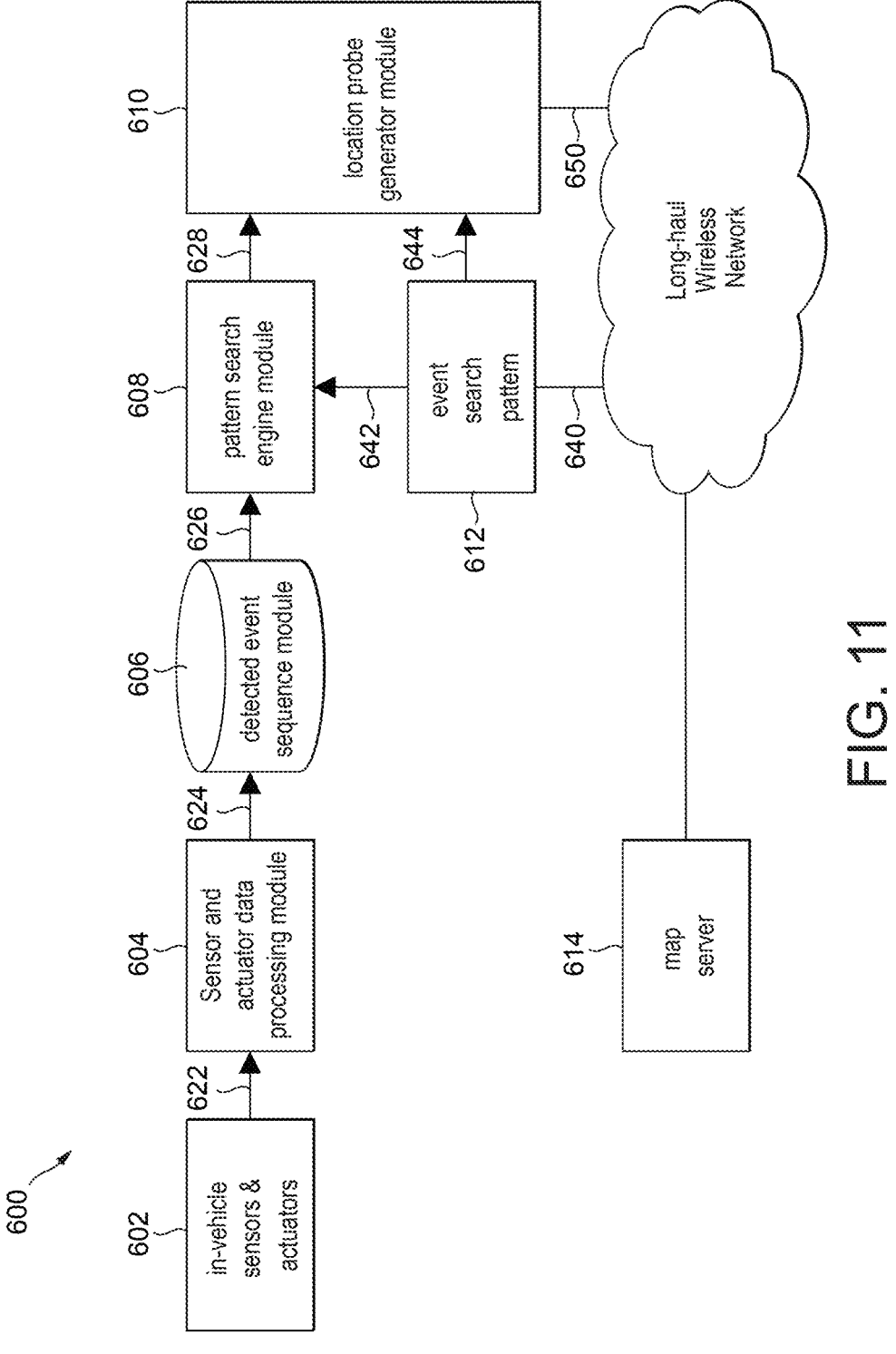
FIG. 11 is a schematic diagram indicating a system 600 which may be used in implementing a method in accordance with the invention.

FIG. 11 is a schematic diagram indicating a system 600 which may be used in implementing a method in accordance with the invention. Those parts of the system used to implement the steps involved in one exemplary method for obtaining the detected event sequence data will now be described. In-vehicle sensors and actuators 613 generate sensor and actuator data 622. A sensor and actuator data processing module 604 processes the sensor data and actuator data and generates data indicative of a detected event 624.

The data indicative of a detected event 624 contains an event identifier indicative of the type of the event. The detected event data also typically contains the time of the event and the position of the vehicle at the time of the event. The detected event data 624 is placed to a detected event sequence module 606. The detected event sequence module 606 maintains a log of the detected events, comprising the detected event data in respect of each event in an ordered sequence. The log may be implemented using a database, and stored in any suitable manner.

The sensor and actuator data processing and the detected event sequence log may be provided by modules of the navigation application.

In exemplary embodiments, each detected event is assigned an event identifier in the form of a character, taken from a finite set of possible characters. As an example, a number of events can be described by a character e.g. upper and lower case from the Latin alphabet. The example is shown in the following table.

TABLE 1

| Event description | char | Event description | char |
|---|---|---|---|
| Steering wheel left | a | Steering wheel right | A |
| Passenger door open | b | Passenger door closed | B |
| Driver door open | c | Driver door closed | C |
| Vehicle on (key active) | d | Vehicle off (key removed) | D |
| Battery charge increased | e | Fuel level increased | E |
| Passenger window down | f | Passenger window up | F |
| Driver window down | g | Driver window up | G |
| GPS network out of reach | h | GPS network connected | H |
| Mobile network out of reach | i | Mobile network connected | I |
| Vehicle accelerates | j | Vehicle decelerates | J |
| Vehicle moves forward slowly | k | Vehicle moves backward slowly | K |
| Breaks on (vehicle stationary) | l | Breaks off (vehicle stationary) | L |
| Handbrake on | m | Handbrakes off | M |
| Door unlocked | n | Doors locked | N |

Table 1 contains a list of event descriptions each having a single character related to that event. So, a left cornering action results in the character 'a' being added to the sensor event sequence.

It will be appreciated that the resulting detected event sequence log will include a sequence or string of such characters. Certain operations in relation to the vehicle will be associated with particular (sub) sequences of characters. For example, a parallel parking manoeuvre (assuming driving on the right side of a road and parking on the right side of the road) may be represented by the sensor event sequence string "JklKAaJlALkaJlmLnDcCN". After completing the parking operation, the car is parked at the curb side of the street. It is clear that depending of the amount of available parking space and the capabilities of the driver there may be less or more events (e.g. sub-manoeuvres) involved in the overall manoeuvre to get the vehicle into the parking spot.

Table 1 above uses Latin characters, but any variant character set could be used. The characters also may be (binary) numbers from a set of N numbers {0,1, . . . , N–1}. The list of reported events may vary between vehicle types, which may impact the range of supported or available characters in the sets of characters available for use with each vehicle type.

In addition to a character identifying the type of each detected event, each event has an associated event time and an event position i.e. location. In some use cases, it is useful to record the time and position data in association with the character representing the event. Thus, each character in the log of detected events may include time and position data relating the event described by the character.

Returning to FIG. 10, in step 3, the method involves obtaining data indicative of a search pattern of events ("search pattern data"), and, in step 5, using the search pattern data and at least a portion of the detected event sequence data to determine whether a pattern of detected events matching the obtained search pattern of events is present in the at least a portion of the sequence of detected events.

One way in which such steps may be implemented will now be described.

Pattern Searching

As mentioned above, the detected event processing steps generate a detected event sequence. In the example above, the detected event sequence is represented by a string of characters.

The method of the present invention uses pattern searching of the detected event sequence data to trigger the generation of a location probe.

Returning to FIG. 11, those parts of the system 600 which may be used to implement such a pattern matching process will now be described. As described above, the detected event sequence module 606 stores data indicative of the detected events 624 in the order they have occurred.

The system also includes an event search pattern module 606 which is arranged to provide an event search pattern to a pattern search engine 608. The event search pattern module 606 may receive the event search pattern from a map server, as described below, or may generate or obtain the event search pattern in any suitable manner, depending upon the intended purpose of the pattern matching process. For example, the search pattern data e.g. search string may be integrated into the navigation client software, so the search pattern is embedded data of the navigation application which is distributed and installed. The step of obtaining the search pattern data may then involve retrieving the data from a device storage sub-system. In other embodiments the search pattern data may be generated at a map server and distributed to devices running navigation applications (navigation clients) as part of the navigation client data. For example, the search pattern data may be received by the device during start-up or during configutation of the navigation client (where the user enables the sharing of event probes as described in this application). Various combinations of the above are possible. In general the step of obtaining the search pattern data may involve retrieving the data from a database or generating the data, and may involve only the device, or the device and the server. The pattern search engine 608 is also arranged to receive detected event sequence data 626 from the detected event sequence module 606. The pattern search engine 608 will search at least a portion of the detected event sequence data 626 for a match to the event search pattern. Initially, the entire sequence of detected events will be searched. However, where the method is performed multiple times, as new detected event data is logged, after an initial match has been found, the pattern search engine 608 may be arranged to only search detected event data which has been added to the detected event sequence log since the previous match was found. This may be achieved by the pattern search engine setting an offset at which to continue searching for a new pattern when a match is found. This offset is initially set to the beginning of the sequence at the start of the matching process.

The pattern search engine 608 is arranged to output matching event search pattern data 628 where such matching data is found, e.g. to a location probe generator 610, which will be described later.

The pattern search engine 608 may be arranged to scan the detected event sequence data for a match to the obtained event search pattern periodically, or whenever a new detected event is added, or in any other manner desired.

The event search pattern module 606 may also be arranged to provide a search pattern identifier 644 indicative of the event search pattern for output e.g. to a location probe generator 610, which will be described later. The search pattern identifier 644 may be a more space efficient expression of the event search pattern obtained through any suitable operation(s) on the event search pattern e.g. through the compression or hashing of the event search pattern. The event search pattern identifier 644 may be equivalent to a short name for the search pattern. If the search pattern identifier 644 is provded to the location probe generator module 610, this enables the search pattern identifier to be included in the probe data to enable the traffic information server to identify the search pattern that caused the generation of the probe. As it is desirable to keep the amount of data in a probe message limited, it is helpful to use an abbreviated form of the search pattern e.g. string in the probe data, which will still enable the search pattern to be identified. The number of search patterns may be limited. Of course, depending upon the nature of the event search pattern, data indicative of the event search pattern itself rather than a pattern identifier may be provided to the location probe generator module for inclusion in probe data samples, or both a search pattern identifer and search pattern may be provided.

The event search pattern 642 is used to configure the pattern search engine 602 to find a matching event search pattern 628 in the detected event sequence data.

The pattern search engine 608 and the event search pattern module 606 may be provided as pluggable software applications (e.g. applet, script, code), which may be used to provide an extension of the usual navigation application functionality.

Any suitable searching techniques for implementing the search for a specific event search pattern in the detected event sequence data may be used. Such techniques include regular expressions, non-deterministic finite automatons, deterministic finite automatons, recursive descent parsers, trigram searches, fuzzy searches, etc. Thus, while in the embodiments herein, the detected event sequence data is described as being in the form of text, such that a text searching techniques is used, in alternative embodiments, the sequence data may be in the form of images, with an image search being used.

One example of a suitable pattern searching process which may operate on the detected event sequence data of the type exemplified above, in the form of a string of characters, will now be described.

Here the detected event sequence data is a string containing the characters from the set {'a', . . . , 'm', 'A' . . . , 'M'}. As described above, in one example, the parallel parking of a vehicle may result in the string "JklKAaJlAL-kaJlmLnDcCN" being placed in detected event sequence log.

A simple method of searching for a parallel parking manoeuvre in the detected event log would be to search for an exact match for the string "JklKAaJlALkaJlmLnDcCN"

in the detected event sequence log. In this case the event search pattern 628 would also be the string "JklKAaJlAL-kaJlmLnDcCN".

Such a method may be implemented using a string-searching algorithm, where the event search pattern and the text to be searched are equivalent to respectively a search string and the detected event sequence (or at least the portion thereof that is to be considered).

As mentioned above, a detected event is obtained from processing sensor data and actuator data. Each detected event can be assigned an event type representing a character (element) from an alphabet (a finite set). The detected events are added to the detected event sequence e.g. log in the order that they are detected resulting in a time ordered detected event sequence. The invention uses an event search pattern to search the detected event sequence (or at least a portion thereof being considered).

One widely used technique for describing the string-searching process is a regular expression (a rational expression, a search pattern expression) that operates on a text (of characters). The regular expression specifies the combination of characters for a matching search result. The event search pattern thus may comprise a regular expression (event search pattern) for finding a matching search result and a regular expression identifier (event search pattern identifier) for use in the location probe generation.

As the exact sequence is dependent upon available parking space, the driver's parallel parking skills, and the range of events supported by the vehicle, rather than requiring an exact match, in some embodiments, it may be desirable to use an event search pattern that searches for a sequence of specific events that occur repeatedly, possibly separated by other events. Such patterns can also be effectively expressed using a regular expression.

In such embodiments, the regular expression for the parallel parking example may specify that the search engine needs to search for a sequence of slow forward 'k' and slow backwards vehicle movements 'K' separated only by events typically associated with parking (e.g. steering "aA", braking "lL", accelerating/decelerating "jJ", handbrake on/off "mM", door lock/unlock "nN"), and that ends with a "vehicle off" 'D' event.

The regular expression matching may be indicated in matches (bold) of alternating 'k' and 'K' events separated by only sub patterns containing characters from the string "aAjJlLnN" and terminating with a character 'D' (strike-through). The result of this pattern matching on the example string of detected events can be represented by; "Jkl-KAaJlALkaJlmLnDcCN". The matched sequence of detected events would be the string "klKAaJlAL-kaJlmLnD".

An example regular expression for implementing the pattern matching described above is:
/k[ajlmnAJLN]*K[ajlmnAJLN]*(k*[ajlmnAJLMN]*K*[ajlmnAJLN]*)*D/

It will be appreciated that tools to create, test and verify regular expressions such as the one described above are known. For example, various websites such as https://regexr.com/ provide a platform for doing this. The regular expression providing the event search pattern in this example (using the PCRE syntax) contains a first part that searches for (matches) a first slow forward event character 'k' and a slow backward event character 'K' each of these two character followed by a allowed set of vehicle events (the set "ajlmnAJLN"). The second part between brackets searches for zero or more slow forward or backward movements (again with an optional sequence of allowed other events) until the terminating vehicle off event character 'D' is found. This regular expression search will match a wider range of patterns in the detected event sequence data compared to exact string matching.

In this example, the searched sequence of detected events 626 is the string "JklKAaJlALkaJlmLnDcCN", the event search pattern 642 is "/k[ajlmnAJLN]*K[ajlmnAJLN]*(k*[ajlmnAJLMN]*K*[ajlmnAJLN]*)*D/", and the pattern search engine 608 produces the matching event search pattern 628 "klKAaJlALkaJlmLnD".

The search pattern identifier 644 for this example can be an identifier provided in an event search pattern message, and may be the event search pattern (string), or the result of applying a compression or hash function to the event search pattern.

The above example shows that the event search pattern provides an indication of a (potential) street parking manoeuvre. If there are several other such manoeuvres at the same location, (by the same, or other vehicles) this may be taken to provide an indication that there is a street parking at that location.

The searching of the detected event sequence data may be applied to provide indications of other types of Points of Interest and their location. The table below lists a number of such POIs and a brief description of the detected event types indicative of the POI for each type of POI. Where applicable, it has been found that entrance or exit locations e.g. of a private parking facility may be determined.

TABLE 2

| Point of Interest (POI) | Description of detected events indicative of POI |
| --- | --- |
| EV charge point | Increase in battery charge when vehicle is in power off state |
| Refuelling station | Increase in fuel level when vehicle is in power off state |
| Private parking facility | Slow moving in combination with window up and down movements followed by a loss of GPS signal |
| Street side parking | See example above |
| Vehicle repair POI | Reduction in number of vehicle maintenance alert, changed configuration parameters (oil pressure, software update, tyre pressure) when mostly stationary |
| Car wash facility | Detection of vehicle movement when vehicle should be stationary (e.g. in neutral gear) |
| Speed camera detection | Unexpected braking or speed reductions at unexpected location |

The table examples show how detected event log data may be searched for a specific pattern that is typically associated with a specific type of POI.

Location Probe Generation

The pattern searching described in the previous section provides an indication of the existence of a point of interest relevant when operating a vehicle. Such data is advantageously provided to a map server for use in determining whether the POI is correctly reflected by current map data, and determining whether any update may be needed. This may ensure that accurate map data is available, enabling POI data to be shared via the map server with multiple users.

To enable the map server to perform such functions, a location probe generator is used to generate a location probe data sample indicative of the matching pattern and a position (i.e. vehicle location) associated therewith.

Returning to FIG. 10, when a match is found between the event search pattern and the detected event sequence data considered, a probe data sample is generated including data indicative of the matching pattern of detected events from the detected event sequence data and a position associated therewith, and the probe data sample is transmitted to a map server—step 7.

Returning now to FIG. 11, the system includes a location probe generator 610 and a communication interface between the navigation client in the vehicle and a map server 614. The location probe generator 610 receives data indicative of the matched pattern of detected events 628 found in the detected event sequence from the pattern search engine 608. This indicates that the required event search pattern has been found in the detected event sequence log 606. The probe generator 610 also receives the search pattern identifier 644 from the event search pattern module 612.

This triggers the location probe generator 610 to generate a location probe message 650 (i.e. probe data sample) that comprises the search pattern identifier 644 and a position of the vehicle associated with the matched pattern of detected events 628. The position may be a position of the vehicle at the time of the match, and thus may be obtained from GPS or similar location sensors of the navigation client, or it may be obtained from one of the detected events forming part of the matching event search pattern 628 i.e. a position associated therewith, or it may be obtained from the detected event sequence storage log 606 (e.g. based on the position of the vehicle at the time the detected event was added). It may be necessary to determine the most relevant position for inclusion in the probe data sample where different ones of the matched detected events are associated with different times, or were logged at different times.

In some embodiments, the location probe generator 610 may generate a location probe message i.e. probe data sample that additionally comprises a time value associated with the matched pattern of detected events 628. This may be the time of finding the match, or the time recorded for one of the events in the matching event search pattern, or the time of addition of the event to the detected event sequence log etc.

In some embodiments, the location probe generator 610 may include the matched pattern of detected events 628 in the generated location probe message.

The location probe generator also may provide additional information dependent on the type of POI indicated by the matched pattern of detected events. For example it may include fuel type for a fuel station POI based on the type of fuel that the vehicle is using. Similarly, for an EV charge point POI the location probe generator may include parameters describing voltage, detected charge rates, charge plug types associated with the vehicle.

It will be appreciated that the sensor and actuator data processing module 604, the detected event sequence module 606, the pattern search engine 608, and the location probe generator 610 may all be provided by modules of the navigation client. The navigation client is, along with a plurality of other similar navigation clients, in communication with a map server 614 via a long-haul wireless network.

Each navigation client may use a communication interface to exchange information with the map server 614. The location probe generator 612 produces the location probe message 650 and sends it to the map server 614 through the communication interface. The event search pattern module 612 of the navigation application receives event searching information 650 from the map server 614. This searching information may comprise the event search pattern 642 and the search pattern identifier 644.

Detected event data may be continually added to the log at the detected event sequence module 606. The pattern search engine 608 may scan the detected event sequence periodically (or when an event has been added). When a matching pattern has been found, the pattern search engine may set an offset at which to continue searching for a new pattern. This offset into the sensor event sequence is initially set to the beginning of the sequence at the start of the navigation client application.

It will be appreciated that the above steps may be repeated in relation to other event search patterns provided by the event search pattern module 612 (which may be received from the map server). Each such pattern may be associated with a different type of POI, such as POIs in the list of Table 2. The detected event sequence data may be searched in relation to each different type of event search pattern, with appropriate offsets being set in respect of each type of event search pattern when a match is found, to enable repeated searching as the detected event sequence data is extended as described above. Processing of multiple search patterns may occur sequentially or in parallel.

Provided that some data indicative of the matched pattern found in the sequence of detected events is provided in the probe data samples, it is not necessary that this includes the search pattern identifier. The data indicative of the matched pattern may be the matched pattern, or, it is envisaged could be the event search pattern, which in some cases may be identical to the matched pattern in the detected event sequence data. Preferably data indicative of the matched pattern and the search pattern identifier are included in the probe data samples.

The pattern search engine can be any search engine, such as a regular expression engine.

Figure 12:
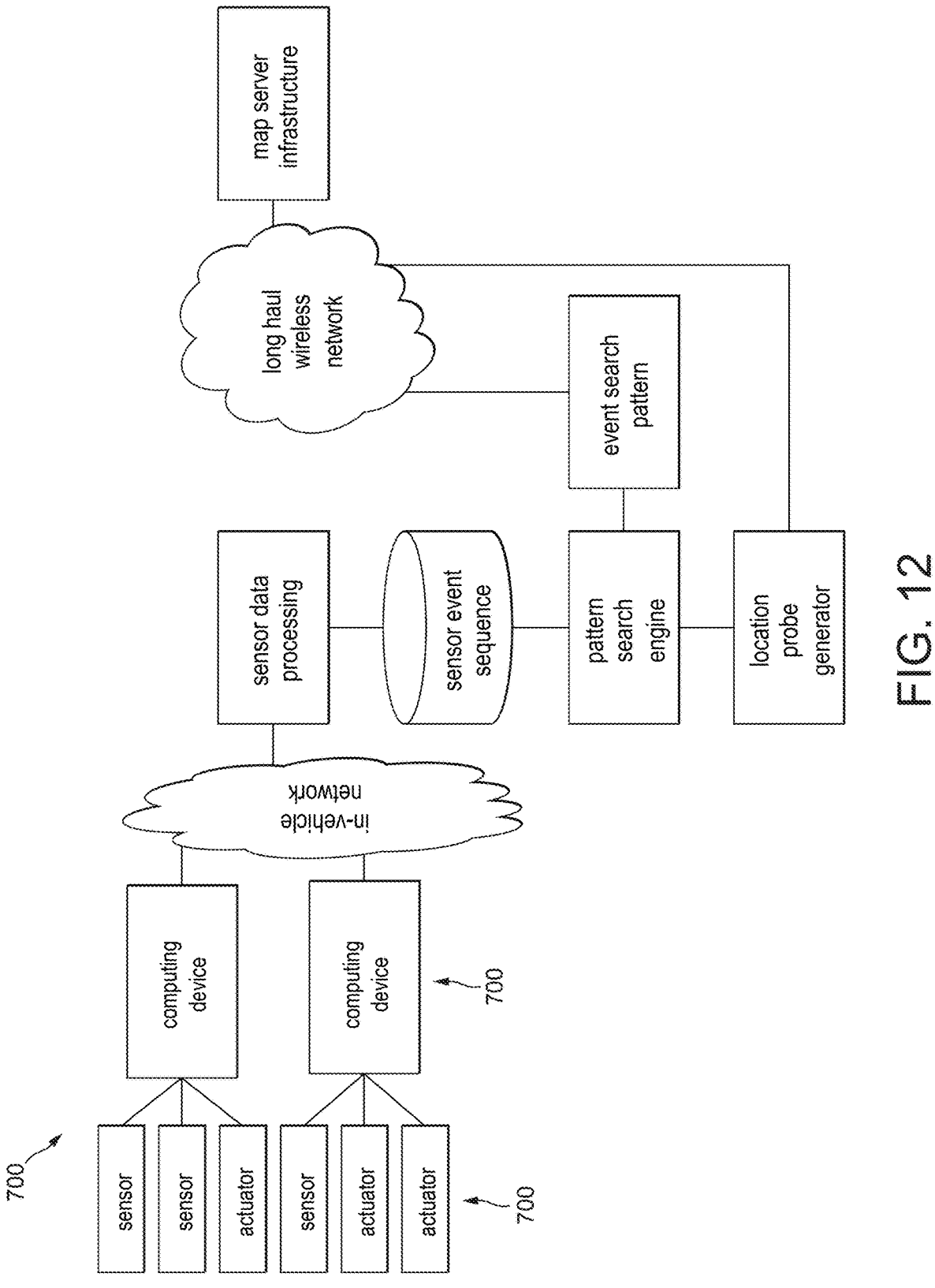
FIG. 12 is a schematic diagram of another system 700 similar to that of FIG. 11 which may be used to implement the methods of the present invention.

FIG. 12 is a schematic diagram of another system 700 similar to that of FIG. 11 which may be used to implement the methods of the present invention. This system illustrates various sensors and actuators 702 which may provide data to computing devices 702 associated with the vehicle. Data may be provided from these computing devices across the in-vehicle network to the sensors and actuator data processing module of a navigation client operating in accordance with the methods described herein. The navigation client may be run on the same or other computing devices of the vehicle to those indicated at 702. The other components of the system are similar to those described in relation to FIG. 11. In the system of FIG. 12, the event search pattern module is not shown as being in communication with the location probe generator. This illustrates an alternative option, in which the search pattern identifier may be provided via the pattern search engine to the location probe generator.

The invention enables new location probes that provide indications of a specific type of a POI at a location. The processing of these new location probes enable the generation of accurate and current POI information.

Returning to FIG. 10, in step 9, a map server receives the generated probe data sample, and uses the probe data sample in updating POI data associated with an electronic map. For example, the type and location of POI indicated by the probe data sample may be compared to existing electronic map data. If the POI is absent from the existing map data, or its location or type not accurately reflected, the map data may be modified. Thus, the method may involve adding or modifying a POI to an electronic map. The probe data samples generated in accordance with the invention may be used together with other corroborating data to determine whether to update the map e.g. corresponding probe data samples obtained at different times from the same or other navigation applications, or data from other sources.

While the invention has been described in the context of updating POI data, the probe data samples generated may be used in performing other methods in relation to electronic map data.

It will be appreciated that it is not necessary for all of the steps described in relation to a navigation client in performing a method in accordance with the invention to be performed by such a navigation client, and some or all of the steps may be performed by a server based on information provided thereto by a navigation client. For example, any one or ones of the sensor event sequence module, pattern search engine and event search pattern module might be implemented using a server, which may or may not be the map server described.

A POI refers to a point of interest. A point of interest is associated with electronic map data to indicate a location associated with an attribute of interest, such as a particular facility e.g. car wash, charge point, refuelling station, parking facility, street side parking, vehicle repair facility or object e.g. speed camera. While the attribute of interest may be a physical object, such as a facility or building, it may be an attribute such as a viewpoint. The POI may be of general interest, or of interest to a specific user.

It will be seen that the methods described herein are useful in enabling map information updating to be carried out automatically. Current practice still requires a substantial amount of human involvement to resolve cases where the collected data cannot be resolved automatically. In other cases, the time to collect local map information is too long to accurately reflect changing map information (roads, junctions, POIs). As map information changes at a rate of 10 percent per year, compiling POI information from probe data is an important technique to keep information up to date and accurate.

The skilled person will appreciated that an apparatus provided to execute a method as described herein may comprise hardware, software, firmware or any combination of two or more of these.

The skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

What is claimed is:

1. A method in which a device associated with a vehicle generates and transmits probe data samples comprising positional data, the method comprising:

obtaining a sequence of detected event data, each of the detected event data including data received from an actuator operated by a person or an in-vehicle control system to move a component of the vehicle;

obtaining a plurality of search pattern data, each of the plurality of search pattern data comprising a respective sequence of vehicle events indicative of a different respective point of interest type;

determining that one of the plurality of search pattern data matches at least a portion of the sequence of detected event data;

in response to determining that one of the plurality of search pattern data matches at least the portion of the sequence of detected event data, generating a probe data sample comprising data indicative of the determined one of the plurality of search pattern data and positional data of the vehicle; and transmitting the probe data sample.

2. The method of claim 1, wherein obtaining the sequence of detected event data comprises generating the sequence of detected event data by detecting each event relating to the vehicle based on data obtained from one or more sensors and/or one or more actuators associated with the vehicle.

3. The method of claim 1, wherein the sequence of detected event data comprises, for each event, at least one of data indicative of the type of event and data indicative of a time and/or position associated with the event.

4. The method of claim 1, wherein the sequence of detected event data comprises a time ordered log of detected events.

5. The method of claim 1, wherein the detected events include one or more of: a turn of a steering wheel, an opening or closing of a door, a change in battery state, a change in fuel level, an actuation of a window, a change in connectivity of the vehicle, an acceleration or deceleration, a movement of the vehicle in a given direction, an application or removal of brakes, and a locking or unlocking of doors.

6. The method of claim 1, wherein:

the sequence of detected event data comprises a plurality of event codes;

each event code in the plurality of the event codes is in the form of a character from among a specified set of characters; and each of the at least one search pattern data comprises a search string of characters.

7. The method of claim 6, wherein each character in the specified set of characters is indicative of a given type of detected event.

8. The method of claim 1, wherein the at least one search pattern data is defined by a regular expression.

9. The method of claim 1, wherein the probe data sample further comprises a search pattern identifier indicative of the determined one of the plurality of search pattern data.

10. The method of claim 1, wherein the probe data sample further comprises data indicative of a time associated with the determined one of the plurality of search pattern data.

11. The method of claim 1, further comprising receiving the probe data sample transmitted by the device and using the probe data sample to perform an operation in relation to electronic map data.

12. The method of claim 11, wherein the operation is an operation in relation to point of interest (POI) data associated with the electronic map.

13. The method of claim 11, comprising using the determined one of the plurality of search pattern data to identify a type of POI with respect to which to perform the operation.

14. The method of claim 12, wherein the POI is selected from: a street-side parking location, a private parking facility, a vehicle repair facility, a car wash facility, an electric vehicle charging facility, a refueling facility, or a speed camera.

15. The method of claim 12, wherein the operation in relation to the POI data associated with the electronic map comprises deleting, modifying, or verifying data indicative of a POI associated with the electronic map or associating a data indicative of a new POI with the electronic map.

16. The method of claim 1, wherein the sequence of detected event data comprises events expected to be associated with a parking maneuver.

17. The method of claim 1, wherein the plurality of search pattern data is obtained from a server.

18. The method of claim 1, wherein obtaining the sequence of detected event data comprises generating the detected event data by detecting each event relating to the vehicle based on data obtained from:

more than one sensor; or a combination of one or more sensor and one or more actuator.

19. The method of claim 1, wherein transmitting the probe data sample comprises:

communicating the probe data sample from the device to an other device, wherein the other device uses some or all of the data indicative of the determined one of the at least one search pattern data and positional data of the vehicle in one or more operations on electronic map data stored in the other device.

20. A non-transitory computer-readable storage medium storing instructions that, when executed by a device associated with a vehicle, cause the device to perform a method for generating and transmitting probe data samples comprising positional data, the method comprising:

obtaining a sequence of detected event data, each of the detected event data including data received from an actuator operated by a person or an in-vehicle control system to move a component of the vehicle;

obtaining a plurality of search pattern data, each of the plurality of search pattern data comprising a respective sequence of vehicle events indicative of a different point of interest type;

determining that one of the plurality of search pattern data matches at least a portion of the sequence of detected event data;

in response to determining that one of the a plurality of search pattern data matches at least the portion of the sequence of detected event data, generating a probe data sample comprising data indicative of the determined one of the plurality of search pattern data and positional data of the vehicle; and transmitting the probe data sample.

21. A device that generates and transmits probe data samples comprising positional data, and the device comprising:

circuitry for at least one subsystem, the circuitry for the at least one subsystem configured to:

obtain a sequence of detected event data, each of the detected event data including data received from an actuator operated by a person or an in-vehicle control system to move a component of a vehicle with which the device is associated;

obtain a plurality of search pattern data, each of the plurality of search pattern data comprising a respective sequence of vehicle events indicative of a different point of interest type;

determine that one of the plurality of search pattern data matches at least a portion of the sequence of detected event data;

in response to the determination that one of the plurality of search pattern data matches at least the portion of the sequence of detected event data, generate a probe data sample comprising data indicative of the determined one of the plurality of search pattern data and positional data of the vehicle; and transmit the probe data sample.

\* \* \* \* \*